(12) United States Patent
Takamatsu et al.

(10) Patent No.: US 8,380,727 B2
(45) Date of Patent: Feb. 19, 2013

(54) INFORMATION PROCESSING DEVICE AND METHOD, PROGRAM, AND RECORDING MEDIUM

(75) Inventors: Shingo Takamatsu, Tokyo (JP); Kei Tateno, Kanagawa (JP); Tomohiro Tsunoda, Tokyo (JP)

(73) Assignee: Sony Corporation, Tokyo (JP)

( * ) Notice: Subject to any disclaimer, the term of this patent is extended or adjusted under 35 U.S.C. 154(b) by 418 days.

(21) Appl. No.: 12/326,624

(22) Filed: Dec. 2, 2008

(65) Prior Publication Data

US 2009/0177651 A1 Jul. 9, 2009

(30) Foreign Application Priority Data

| Dec. 4, 2007 | (JP) | ................................ P2007-313098 |
| Dec. 4, 2007 | (JP) | ................................ P2007-313099 |
| May 8, 2008 | (JP) | ................................ P2008-122172 |

(51) Int. Cl.
  *G06F 17/30* (2006.01)
(52) U.S. Cl. ........................ 707/758; 707/778
(58) Field of Classification Search .................. 707/758, 707/778
  See application file for complete search history.

(56) References Cited

U.S. PATENT DOCUMENTS

| 7,689,624 | B2 * | 3/2010 | Huang et al. .................. 707/760 |
| 7,818,420 | B1 * | 10/2010 | Taylor ........................... 709/224 |
| 2002/0107853 | A1 | 8/2002 | Hofmann et al. |
| 2006/0190523 | A1 * | 8/2006 | Jasani ............................ 709/201 |
| 2006/0265317 | A1 * | 11/2006 | Duquette ....................... 705/37 |
| 2007/0072468 | A1 * | 3/2007 | Terrill et al. ................... 439/260 |
| 2007/0073549 | A1 * | 3/2007 | Terrill et al. ...................... 705/1 |
| 2007/0192170 | A1 * | 8/2007 | Cristol .............................. 705/10 |
| 2008/0051033 | A1 * | 2/2008 | Hymes ............................ 455/47 |
| 2008/0215555 | A1 * | 9/2008 | Pan et al. ......................... 707/3 |
| 2010/0120143 | A1 * | 5/2010 | Oh et al. ........................ 435/366 |

FOREIGN PATENT DOCUMENTS

| JP | 2000-194724 | 7/2000 |
| JP | 2005-165632 | 6/2005 |
| JP | 2006-146622 | 6/2006 |
| JP | 2007-122683 | 5/2007 |

(Continued)

OTHER PUBLICATIONS

Yoko Nishihara et al.; "Animation Interface Supporting Human Interpretation of Individual Differences in Preference", Journal of Japan Society for Fuzzy Theory and Intelligent Informatics, pp. 1-13, (2007).

(Continued)

*Primary Examiner* — Kim Nguyen
(74) *Attorney, Agent, or Firm* — Finnegan, Henderson, Farabow, Garrett & Dunner LLP

(57) ABSTRACT

An information processing device includes: a user information obtaining unit configured to obtain information relating to data of content that a user has used; a meta information obtaining unit configured to obtain content meta information corresponding to content that the user has used; a first vector generating unit configured to generate a first user preference vector with each of the obtained content meta information as elements thereof; a second vector generating unit configured to generate a second user preference vector wherein the generated first user preference vector is analyzed and the number of elements of the first user preference vector is compressed; and a user identifying unit configured to identify a user corresponding to a second user preference vector having a high similarity to a second user preference vector determined beforehand from multiple second user preference vectors.

15 Claims, 23 Drawing Sheets

FOREIGN PATENT DOCUMENTS

JP            2007-282042            10/2007

OTHER PUBLICATIONS

Notification of Reasons for Refusal, in Japanese Patent Application No. 2007-313099, filed Dec. 4, 2007 (Drafting date: Aug. 25, 2009).
X. Jin et al., "Web Usage Mining Based on Probabilistic Latent Semantic Analysis", Proc. of the Tenth ACM SIGKDD Conference on Knowledge Discovery and Data Mining (KDD'04), Seattle, Washington, pp. 197-205 (2004).
T. Hofmann, "Probabilistic Latent Semantic Analysis", Uncertainty in Artificial Intelligence, 8 pages. (1999).
European Search Report.
Danile M. Blei et al., "Latent Dirichlet Allocation", Journal of Machine Learning Research 3, 2003, pp. 993-1022.
Thomas Hofmann, "Probabilistic Latent Semantic Indexing", Proceedings of the Twenty-Second Annual International SIGIR Conference on Research and Development in Information Retrieval.

\* cited by examiner

FIG. 3

| CONTENT | WEIGHTING | META INFORMATION a | META INFORMATION b | META INFORMATION c |
|---|---|---|---|---|
| CONTENT 1 | 0.4 | 1 | | |
| CONTENT 2 | 0.9 | | | 1 |
| CONTENT 3 | 0.4 | | | 1 |
| USER PREFERENCE INFORMATION A | | 0.4 | 0 | 1.3 |

FIG. 4

| CONTENT | WEIGHTING | CONTENT 1 | CONTENT 2 | CONTENT 3 |
|---|---|---|---|---|
| CONTENT 1 | 0.4 | 1 | | |
| CONTENT 2 | 0.9 | | 1 | |
| CONTENT 3 | 0.4 | | | 1 |
| USER PREFERENCE INFORMATION A | | 0.4 | 0.9 | 0.4 |

FIG. 5

| PREFERENCE INFORMATION A | ELEMENT A1 | ELEMENT A2 | ELEMENT A3 | ELEMENT A4 | ELEMENT A5 |
|---|---|---|---|---|---|
| USER 1 | 0 | 1.5 | 0.7 | 0 | 0.8 |
| USER 2 | 1 | 0 | 0 | 1.2 | 0 |
| USER 3 | 0.6 | 0 | 0 | 0 | 1.0 |

FIG. 6

| PREFERENCE INFORMATION B | ELEMENT B1 | ELEMENT B2 | ELEMENT B3 |
|---|---|---|---|
| USER 1 | 0.4 | 0.4 | 0.2 |
| USER 2 | 0.4 | 0.6 | 0 |
| USER 3 | 0.1 | 0 | 0.9 |

FIG. 7

| INTRODUCTION USER | INTRODUCTION REASON | | |
|---|---|---|---|
| MR. AAA | ELEMENT A1 | ELEMENT A10 | ELEMENT A2 |
| MR. BBB | ELEMENT A9 | ELEMENT A2 | ELEMENT A8 |
| MR. CCC | ELEMENT A5 | ELEMENT A8 | ELEMENT A3 |
| ⋮ | ⋮ | | |

FIG. 21

EXAMPLE OF CONTENT META INFORMATION

| CONTENT META INFORMATION | ELEMENT A1 | ELEMENT A2 | ELEMENT A3 | ELEMENT A4 | ELEMENT A5 |
|---|---|---|---|---|---|
| CONTENT 1 | 0 | 2.0 | 0 | 0 | 1.0 |
| CONTENT 2 | 2.0 | 0 | 0 | 0 | 0 |
| CONTENT 3 | 0 | 0 | 0 | 0 | 2.0 |

FIG. 22

EXAMPLE OF COMPRESSED CONTENT META INFORMATION

| COMPRESSED CONTENT META INFORMATION | ELEMENT B1 | ELEMENT B2 | ELEMENT B3 |
|---|---|---|---|
| CONTENT 1 | 0.6 | 0 | 0.4 |
| CONTENT 2 | 1.0 | 0 | 0 |
| CONTENT 3 | 0 | 0 | 1.0 |

FIG. 26

| INTRODUCION CONTENT | | INTRODUCTION REASON | | |
|---|---|---|---|---|
| CONTENT 4 | ★★★★ | ELEMENT A2 | ELEMENT A5 | |
| CONTENT 5 | ★★★★ | ELEMENT A1 | ELEMENT A2 | ELEMENT A8 |
| CONTENT 6 | ★★★ | ELEMENT A5 | ELEMENT A8 | ELEMENT A3 |
| ⋮ | | | | |

INFORMATION PROCESSING DEVICE AND METHOD, PROGRAM, AND RECORDING MEDIUM

CROSS REFERENCES TO RELATED APPLICATIONS

The present invention contains subject matter related to Japanese Patent Applications JP 2007-313098 and JP 2007-313099 filed in the Japanese Patent Office on Dec. 4, 2007, and to Japanese Patent Applications JP 2008-122172 filed in the Japanese Patent Office on May 8, 2008, the entire contents of which are incorporated herein by reference.

BACKGROUND OF THE INVENTION

1. Field of the Invention

The present invention relates to an information processing device and method, program, and recording medium, and in particular relates to an information processing device and method, program, and recording medium that can effectively determine the similarity between users or contents.

2. Description of the Related Art

In recent years, there have been web services on the Internet and so forth to introduce a certain user to another user. These services promote meetings between users or discovery of new content via other users, and provide a new user experience.

With such a service, user information which is generated by a user using a website is analyzed, and a user to be introduced is determined. "User information" here is information such as history of website usage or content information that a user has disclosed. For example, with a website according to http://www.last.fm, a service is provided wherein the history of music listened to that a user has disclosed is analyzed, whereby a similar user is introduced.

With such a service, for example services which introduce users that match a portion of the usage history of the user or content disclosed by the user (i.e. user information) make up a majority of the services.

Also, a technique has been proposed, for example, to generate appropriate user preference information as vectors in order to recommend content (e.g. Japanese Unexamined Patent Application Publication No. 2005-165632).

SUMMARY OF THE INVENTION

However, with a service according to related art, there is a problem wherein users having overall similar user information but no portion wherein a specific element of user information match are not determined as similar users, and determining a similar user only by matching or not matching specific elements of user information is insufficient. Also, the related art has been insufficient in that content similarity is not taken into consideration.

There has been recognized the demand for enabling determination of similarity between users or contents more effectively.

According to an embodiment of the present invention, an information processing device includes a user information obtaining unit configured to obtain information relating to data of content that a user has used; a meta information obtaining unit configured to obtain content meta information corresponding to content that the user has used; a first vector generating unit configured to generate a first user preference vector with each of the obtained content meta information as elements thereof; a second vector generating unit configured to generate a second user preference vector wherein the generated first user preference vector is analyzed and the number of elements of the first user preference vector is compressed; and a user specifying unit configured to specify a user corresponding to a second user preference vector having a high similarity to a second user preference vector determined beforehand from multiple second user preference vectors.

The second vector may generate the compresses the number of elements of the first user preference vector by performing analysis with a multi-topic model regarding the first user preference vector.

The second vector may generate the performs analysis of a PLSA (Probabilistic Latent Semantic Analysis) multi-topic model, and reads in multiple first user preference vectors beforehand and learns a parameter of a probability model of the PLSA.

The predetermined second user preference vector provided beforehand may be the second user preference vector of the using user requesting introduction of a user with similar preferences to oneself, wherein the user identifying unit identifies a user corresponding to that which is predetermined from the second user preference vectors stored beforehand, as an introducing user to be introduced to the using user.

The user identifying unit may extract a user corresponding to that which is predetermined from the first user preference vector stored beforehand, as a candidate user, based on the first user preference vector of the using user, wherein a user corresponding to that which is predetermined from the second user preference vector of the candidate user, as an introducing user to be introduced to the using user.

The similarity may be computed based on Euclidian distance between the second user preference vector of the using user and the second user preference vector of each of the candidate users, wherein the user identifying unit identifies a user corresponding to the second user preference vector which has the similarity of a threshold amount set beforehand or greater, as the introducing user.

The information processing device may further include an introducing user presenting unit configured to generate data for a screen to present a list of the introducing users to the using user; wherein the introducing user presenting unit generates an introduction reason for introducing the introducing user to the using user, based on the elements of the first user preference vectors of the introducing user.

The introduction reason may be generated based on a predetermined number of element names extracted from the elements of the first user preference vectors of the introducing user, in the order of large values.

The introducing user presenting unit may further extract a predetermined number of elements of the elements of the first user preference vectors of the using user in the order of large values, wherein in the case that each of the elements of the first user preference vector elements of the introducing user extracted in order to generate the introduction reason are the same elements as the elements extracted from the first user preference vector of the using user, the introduction reason generated based on the name of the same elements therein is displayed in a state differing from a display of the introduction reason generated based on another element name.

According to an embodiment of the present invention, an information processing method includes the steps of: obtaining information relating to data of content that a user has used; obtaining content meta information corresponding to content that the user has used; generating a first user preference vector with each of the obtained content meta information as elements thereof; generating a second user preference vector wherein the generated first user preference vector is analyzed and the number of elements of the first user preference vector is compressed; and identifying a user corresponding to a second user preference vector having a high similarity to a second user preference vector determined beforehand from multiple second user preference vectors.

According to an embodiment of the present invention, a program causes a computer to function as an information processing device including: a user information obtaining unit configured to obtain information relating to data of content that a user has used; a meta information obtaining unit configured to obtain content meta information corresponding to content that the user has used; a first vector generating unit configured to generate a first user preference vector with each of the obtained content meta information as elements thereof; a second vector generating unit configured to generate a second user preference vector wherein the generated first user preference vector is analyzed and the number of elements of the first user preference vector is compressed; and a user identifying unit configured to identify a user corresponding to a second user preference vector having a high similarity to a second user preference vector determined beforehand from multiple second user preference vectors.

According to the above configuration, information relating to content data that the user has used is obtained, content meta information corresponding to content that the user has used is obtained, a first user preference vector wherein each of the obtained content meta information serve as elements thereof is generated, the generated first user preference vector is analyzed and the second user preference vector wherein the number of elements of the first user preference vectors is compressed is generated, and a user corresponding to the second user preference vector having a high similarity with the predetermined second preference vector provided before from the multiple second user preference vectors is identified.

According to an embodiment of the present invention, an information processing device includes: a user information obtain unit configured to obtain information relating to data of content that a user has used; a meta information obtaining unit configured to obtain content meta information corresponding to content that the user has used; a first vector generating unit configured to generate a first user preference vector with the same number of elements as the obtained content meta information; a second vector generating unit configured to generate a second user preference vector wherein the generated first user preference vector is analyzed and the number of elements of the first user preference vector is compressed; and a third vector generating unit configured to generate a compressed meta information vector wherein the content meta information is analyzed as a vector and the number of elements of the content meta information vector is compressed; and a user identifying unit configured to identify a user corresponding to a second user preference vector having a high similarity to a compressed meta information vector determined beforehand from multiple second user preference vectors.

The information processing device may further include a content identifying unit configured to identify content corresponding to a compressed meta information vector having a high similarity to a second user preference vector determined beforehand from multiple compressed meta information vectors.

The information processing device may further include a content identifying unit configured to identify content corresponding to a compressed meta information vector having a high similarity to a compressed meta information vector determined beforehand from multiple compressed meta information vectors.

According to an embodiment of the present invention, an information processing method includes the steps of: obtaining information relating to data of content that a user has used; obtaining content meta information corresponding to content that the user has used; generating a first user preference vector with the same number of elements as the obtained content meta information; generating a second user preference vector wherein the generated first user preference vector is analyzed and the number of elements of the first user preference vector is compressed; generating a compressed meta information vector wherein the content meta information is analyzed as a vector and the number of elements of the content meta information vector is compressed; and identifying a user corresponding to a second user preference vector having a high similarity to a compressed meta information vector determined beforehand from multiple second user preference vectors.

According to the above configuration, information relating to content data that the user has used is obtained, content meta information corresponding to content that the user has used is obtained, a first user preference vector wherein the same number of elements as the obtained content meta information is generated, the generated first user preference vector is analyzed and the second user preference vector wherein the number of elements of the first user preference vectors is compressed is generated, the content meta information is analyzed as a vector and the compressed meta information vector wherein the number of elements of the content meta information vectors is compressed is generated, and a user corresponding to the second user preference vector having a high similarity with the predetermined compressed meta information vector provided beforehand from the multiple second user preference vectors is identified.

According to the above-described configurations, similarities between users or contents can be more effectively determined.

BRIEF DESCRIPTION OF THE DRAWINGS

FIG. 3 is a diagram illustrating a configuration example of a user preference information A;

FIG. 4 is a diagram illustrating another configuration example of the user preference information A;

FIG. 5 is a diagram illustrating an example of the user preference information A of users 1 through 3;

FIG. 6 is a diagram illustrating an example of user preference information B generated based on the user preference information A in FIG. 5;

FIG. 7 is a diagram illustrating an introducing user list;

FIG. 21 is a diagram illustrating a configuration example of the content meta information;

FIG. 22 is a diagram illustrating a configuration example of compressed content meta information;

FIG. 26 is a diagram illustrating an example of an introduction content list;

DESCRIPTION OF THE PREFERRED EMBODIMENTS

Figure 1:
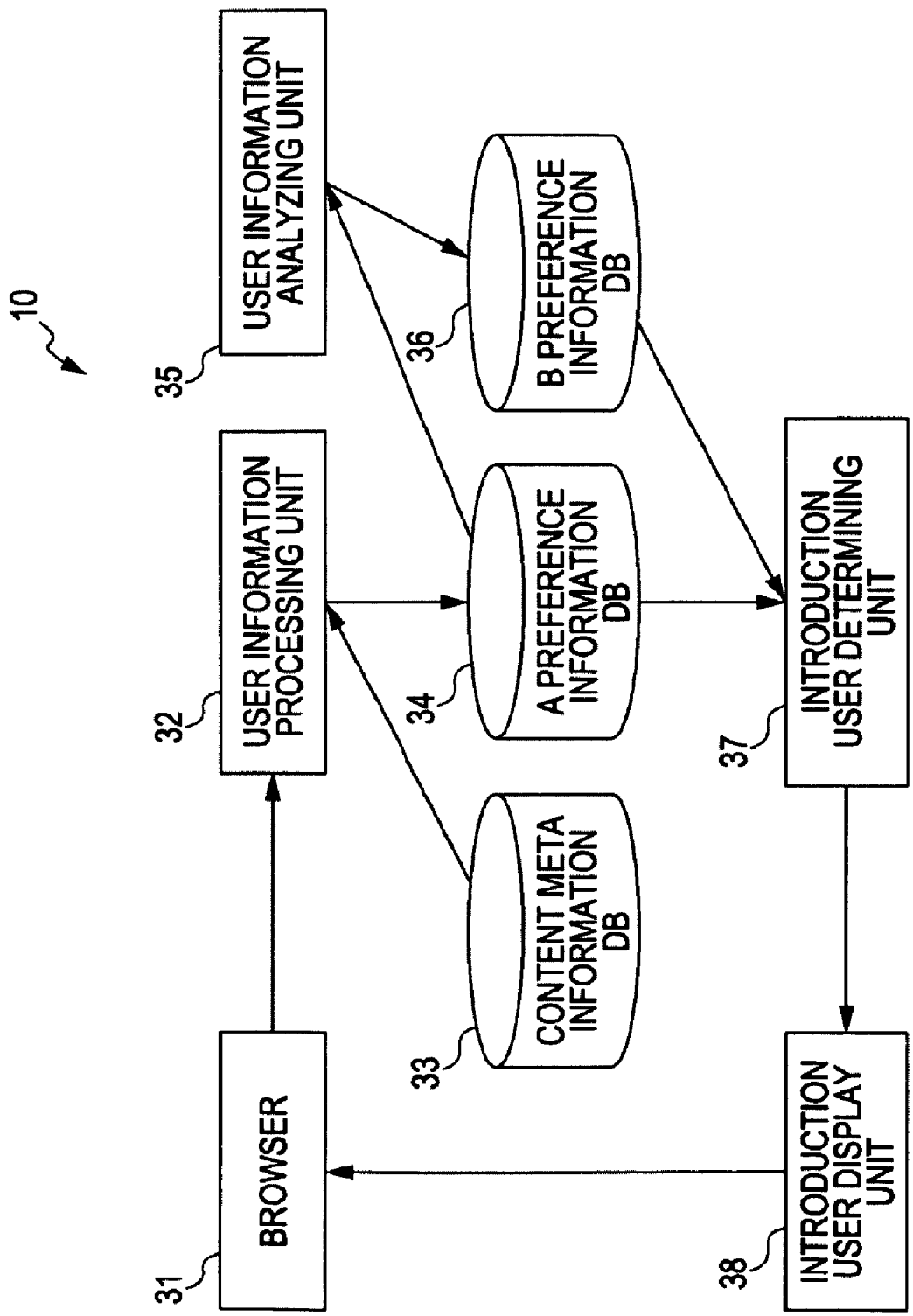
FIG. 1 is a block diagram of a configuration example of a user introduction system according to an embodiment of the present invention.

An embodiment of the present invention will be described with reference to the appended drawings. FIG. 1 is a block diagram showing a configuration example of a user introducing system according to an embodiment of the present invention. A user introducing system 10 is configured as a content website providing a SNS (social networking service), for example. A content website provides media content such as music, movies, videos, television programs, and written works and content such as product sales, and also provides services to introduce a certain user to another user.

With the user introducing system 10, for example personal pages of individual users accessing a content website via a browser installed on a personal computer are provided. A personal page may be arranged with content information that the user discloses, e.g. favorite music and movies. The user of the user introducing system 10 uses a browser installed on the personal computer of the user, accesses the content website via a network such as the Internet, and views a page within the content website or a page linked to the content website. The user introducing system 10 is configured as a server or the like connected to a network such as the Internet. Note that the user introducing system 10 may also be configured with multiple servers that are mutually connected.

A user information processing unit 32 in FIG. 1 is a user having an above-described personal page, and obtains user information from a browser 31 installed in the personal computer or the like of the user accessing the content website. "User information" is, for example, information made up of content website usage history of the user (e.g. viewed pages) and information relating to content disclosed by the user.

Upon obtaining the user information from the browser 31, the user information processing unit 32 reads in the content meta information from the content meta information DB (database) 33, based on the information included in the obtained user information. Now, content meta information expresses data associated with each content, such as genre and artist of music content, words appearing in a review document, and feature amounts extracted by analyzing picture content.

The content meta information database 33 has, for example, an individual ID and content meta information correlated to individual contents and stored therein, and the user information processing unit 32 identifies the content ID included in the user information and the content meta information corresponding to such content is obtained. The content meta information is generated by using information provided by a supplying company (or manufacturer) disclosing the content and so forth, for example, and is stored beforehand in the content meta information database 33.

The user information processing unit 32 generates a user preference information A based on the user information obtained from the browser 31 and the content meta information obtained from the content meta information database 33. Details will be described later, but the user preference information A is to serve as a high dimension vector having many elements. The user preference information A is generated for each of the multiple users, and the generated user preference information A is stored in the A preference information database 34.

The user information analyzing unit 35 reads in and analyzes the user preference information A from the A preference information database 34, and generates the user preference information B. Details will be described later, but the user preference information B is to serve as a vector with the number of elements of user preference information A compressed (decreased), and the user information analyzing unit 35 performs analysis with a multi-topic model, whereby a vector with a compressed number of elements is generated.

A method to obtain an occurrence probability of a word or text may include PLSA (Probabilistic Latent Semantic Analysis), LDA (Latent Dirichlet Allocation) or the like to be described later, as examples of an analysis method with a multi-topic model. The user information analyzing unit 35 performs analysis with PLSA for the user preference information A, for example, whereby a vector with a compressed number of elements is generated. The user preference information B is generated for each of the multiple users, and the generated user preference information B is stored in the B preference information database 36.

The introducing user determining unit 37 filters the user preference information A or user preference information B for each of multiple users having personal pages in the user introducing system 10, based on the user preference information A of the user of the browser 31, and identifies the user corresponding to the user preference information A or user preference information B obtained as a result of the filtering, while extracting the user preference information B of the identified users. The introducing user determining unit 37 computes the similarity between each of the extracted user preference information B and the user preference information B of the user of the browser 31, and determines the user that should be introduced to the user of the browser 31 based on the similarity thereof.

The introducing user presenting unit 38 creates an introduction reason as described later based on the user preference information A of the user determined with the introducing user determining unit 37, and displays an introducing user list displayed together with an introduction reason for the user that should be introduced.

Note that hereafter, a user, which is a user of the browser 31 in FIG. 1, desiring an introduction to another user with the user introducing system 10 will be called a "using user", and a user that the user introducing system 10 has selected as a user that should be introduced to the using user will be called an "introducing user".

Also, description is given here that a predetermined user form the users having a personal page on the user introducing system 10 is selected as an introducing user, but an arrangement may be made wherein, for example, a user which is a manager of a so-called weblog (blog) of which the address such as a URL (Uniform Resource Locator) is registered in the user introducing system 10, may be introduced as an introducing user.

Figure 2:
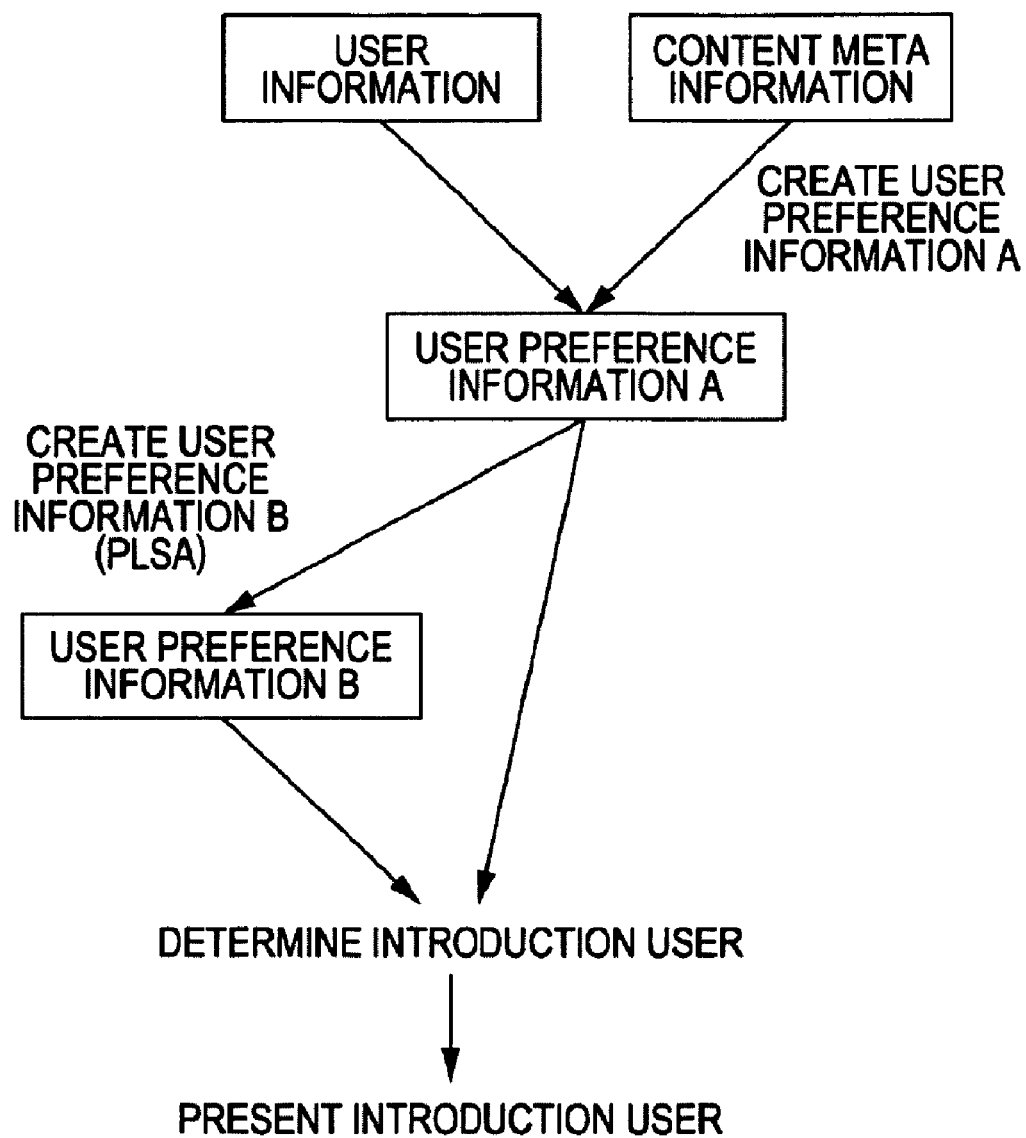
FIG. 2 is a diagram describing the user introducing processing by the user introducing system in FIG. 1.

FIG. 2 is a diagram describing the processing of user introducing with the user introducing system 10. As shown in FIG. 2, a user preference information A is generated based on user information and content meta information. A user preference information B which is a vector with the number of elements compressed is generated by performing analysis with PLSA for the user preference information A.

The introducing user which is a user that should be introduced to the using user is determined based on user preference information A and user preference information B, and the introducing user thereof is presented.

Next, the user preference information A will be described. FIG. 3 is a diagram showing a configuration example of the user preference information A. FIG. 3 shows an example of user preference information A in the case of the user using by viewing/listening to the contents 1 through 3 and recording, wherein the content 1 has content meta information a (denoted as meta information a in the diagram), the content 2 has content meta information c, and the content 3 also has content meta information c (denoted as meta information c in the diagram). In the example in FIG. 3, the content 1 having the meta information a is expressed by inserting a "1" in the cell where the row for the content 1 and the column for the meta information a intersect.

An arrangement is made wherein the content meta information for each content is weighted, and the weighting is actions such as recording or viewing/listening for example, and is determined corresponding to the content use situation. For example, we can say that of content that the user has simply viewed/listened to and content that the user has recorded, the importance to the user differs. That is to say, we can presume that the user had more interest in the recorded content than in the simply viewed/listened to content, and in the event of generating information relating to preferences of the user, weighting according to the use situation (recording, viewing/listening, etc) is desirable.

In the example in FIG. 3, the weighting according to the use situation of the content 1 is "0.4", the weighting according to the use situation of the content 2 is "0.9", and the weighting according to the use situation of the content 3 is "0.4".

The user preference information A vectorizes a value serving as an element which is weighted according to the use situation of each content as to the value (in this case "1" or "0") of each content meta information (in this case, meta information a through meta information c).

In the example in FIG. 3, the values of the elements of the meta information a of the user preference information A is 1×0.4=0.4, of the elements of the meta information b, 0, and of the elements of the meta information c, 1×0.9+1×0.4=1.3, whereby the user preference information A is configured as a three-dimensional real number value vector (0.4, 0, 1.3).

Note that an arrangement may be made wherein the weighting is the same and does not depend on the user situation. For example, in the example in FIG. 3, if the weighting for all is "1", the user preference information A becomes a vector (1, 0, 2).

Also, an arrangement may be made wherein the content meta information is not used, and the content itself is used as an element of the user preference information A. FIG. 4 is a diagram showing a configuration example of the user preference information A in the case of using the content itself as an element. In the case in FIG. 3, the user preference information A becomes a vector (0.4, 0.9, 0.4).

As shown in FIG. 4, in the case of configuring the user preference information A, an arrangement may be made wherein a content meta information database 33 is not provided in FIG. 1. With the example of the user preference information A shown in FIG. 3 or 4, the vector is 3-dimensional, but in reality, the number of elements become massive. This is because there are large amounts of numbers (types) of contents and content meta information. An actual user preference information A becomes an actual value vector of a high dimension of several thousand dimensions to several tens of thousands of dimensions.

Also, we can say that the content which the user actually views/listens to and records is only a small fraction of the large amount of existing content. That is to say, the element value for most user preference information A vectors becomes "0". For most elements to become 0 is referred to as sparse, whereby the user preference information A is a sparse high-dimension vector.

Note that regardless of the content used by the user, the user preference information A is generated so that the number of elements of the user preference information A vector for each user becomes the same. For example, an arrangement may be made wherein a form of the user preference information A is stored in the A preference information database 34 as a vector having a predetermined number of elements, and the user information processing unit 32 generates the user preference information A by writing the value in each element of the form of the user preference information A, corresponding to the user information obtained from the browser 31.

Next, the user preference information B will be described. As described, the user preference information B becomes a relatively low-dimension vector wherein the number of elements of the user preference information A compressed, by performing analysis with PLSA.

The user information analyzing unit 35 in FIG. 1 is configured as a function block which can execute processing for a multi-topic model (e.g. PLSA) analysis, and for example, processing is executed for PLSA analysis as to the input user preference information A, according to parameters of the provided PLSA probability model. Also, the user information analyzing unit 35 executes processing for PLSA analysis as to multiple user preference information A, whereby parameters of an optimal PLSA probability model can be learned.

PLSA is often used for text analysis, for example, and is a method to calculate the occurrence probability of a word by considering one or more probability density to determine the occurrence probability of a word called a topic, and add features to a text with a topic occurrence probability unique to each text. With the PLSA, for example, using a large-scale text corpus, the topic word occurrence probability and topic occurrence probability of the text is identified beforehand with an EM (Expectation Maximization) algorithm. Also, with the PLSA, an arrangement may be made wherein the topic word occurrence probability is provided as a parameter, and the topic occurrence probability of the test corresponding to the input text can be obtained. Note that details of PLSA are described in "Thomas Hofmann, Probabilistic Latent Semantic Indexing, Proceedings of the Twenty-Second Annual International SIGIR Conference on Research and Development in Information Retrieval (SIGIR-99), 1999" and so forth.

Similar operations as PLSA can be made also with LDA (Latent Dirichlet Allocation). LDA is an expansion of PLSA, and details of LDA are described in "David M. Blei, Andrew Y. Ng, Michael I. Jordan, Latent Dirichlet Allocation, Journal of Machine Learning Research 3, 2003". The user information analyzing unit 35 may be arranged to execute the processing of LDA analysis instead of the processing of PLSA analysis.

A description will be given here for an example in the case of using PLSA as analysis with a multi-topic model. That is to say, a PLSA probability model is prepared having set a topic of the same number of elements as the user preference information B or greater, the occurrence probability of each element in the user preference information A is obtained, and the value of elements of the user preference information B is determined based on the occurrence probability of each element in the user preference information A.

FIG. 5 is a diagram showing an example of the user preference information A of the users 1 through 3, and FIG. 6 is a diagram showing an example of the user preference information B generated by performing analysis with PLSA as to the user preference information A in FIG. 5. In order to simplify the explanation, an example will be described here wherein the user preference information A which is a 5-dimensional vector is converted to the user preference information B which is a 3-dimensional vector, but in reality, the user preference information A and user preference information B both become a high dimension vector.

In this case, with the user information analyzing unit 35, the PLSA probability model with a topic number of 3 and parameters identified beforehand is prepared, and the occurrence probability of the elements A1 through A5 of the user preference information A is obtained. With the first topic, the occurrence probability of the elements A1 and A2 are high, and with the second topic, the occurrence probability of elements A3 and A4 are high. That is to say, we can say that the elements A1 and A2 are similar elements, and the elements A3 and A4 are similar elements.

In this case, the first through third topics correspond to the elements B1 through B3 in FIG. 6, so with the user preference information B of the user 1 wherein the value of the element A2 is relatively large, and the user preference information B of the user 2 wherein the value of the element A1 is relatively large, the value of the element B1 is a relatively large value for both. This is because the elements A1 and A2 are similar elements. Also, with the user preference information B of the user 1 wherein the value of the element A3 is relatively large, and the user preference information B of the user 2 wherein the value of the element A4 is relatively large, the value of the element B2 is a relatively large value for both. This is because the elements A3 and A4 are similar elements. Conversely, with the user preference information B of a user 3 wherein each of the elements A1 through A4 are relatively small values, the elements B1 and B2 are relatively small values. Thus, the user preference information A which is a high-dimensional sparse vector can be converted (generated) into the user preference information B which is a lower-dimensional vector.

Also, with the user preference information A, if the value of the element A1 of the user 1 is 0, and value of the element A1 of the user 2 is 1, and only the user preference information A is referenced, there is a gap between the two values whereby it is easy to erroneously say that the preferences of user 1 and user 2 greatly differ. However, with the user preference information B, if the value of the element B1 of the user 1 is 0.4 and the value of the element B1 of the user 2 is 0.4, the likelihood of erroneously determining that the preferences of the user 1 and user 2 greatly differ is lessened. Thus, by generating a user preference information B, the user preference can be compared more simply and accurately.

Note that regardless of the user preference information A, the user preference information B is generated so that the number of elements of the vectors for the user preference information B is the same for each user. For example, an arrangement may be made wherein a form for the user preference information B is stored in the B preference information database 36 as a vector having a preset number of elements, the user information analyzing unit 35 analyzes the user preference information A obtained from the A preference information database 34, and the value is written in each element of the form for the user preference information B, whereby the user preference information B is generated.

Next, the determination of an introducing user will be described in greater detail. As described above, the introducing user determining unit 37 filters the user preference information A for each of the multiple users having a personal page on the user introducing system 10, and a user corresponding to the user preference information A obtained as a result of the filtering is identified, which the user preference information B of the identified users is extracted.

For example, the introducing user determining unit 37 searches elements with the maximum value from the user preference information A of the using user, extracts only users with a value of elements of user preference information A at or above a threshold value, and subject the extracted user to processing (candidate user) thereafter. For example, let us say that the threshold value is ½ of the value of elements having the maximum value in the user preference information A of the using user. For example, in the example in FIG. 5, in the case that the user 3 is the using user, the maximum element of the user 3 is the element A5. The value of the element of the user 1 is 0.8>(1.0/2), so the user 1 becomes a candidate user. On the other hand, the value of the element A5 of the user 2 is 0<(1.0/2), so the user 2 does not become a candidate user.

An example of filtering the user preference information A for each used based on the user preference information A of the using user is described here, but an arrangement may be made wherein the user preference information B is filtered for each user based on the user preference information B of the using user, or wherein each user is filtered using both of user preference information A and the user preference information B of the using user.

Note that an arrangement may be made wherein filtering is not performed, and multiple users having a personal page on the user introducing system 10 all become candidate users.

As described above, the introducing user determining unit 37 computes the similarity between each of the user preference information B of candidate users and the user preference information B of the using user, and determines an introducing user based on the similarity thereof.

The similarity is computed, for example, as a sign inverted value of the Euclidian distance between a vector of the user preference information B of a certain candidate user and a vector of the user preference information B of the using user.

For example in the example in FIG. 6, the similarity between the user 1 and user 2 is computed using the following expression.

$$\{(0.4-0.4)^2+(0.4-0.6)^2+(0.2-0)^2\}=-0.08$$

Note that the similarity is not limited to computation based on Euclidian distance, e.g. may be computed as the inner product of the vector. As long as the user preference information B of two users is input and a real number is output, any calculation method may be used.

A description is given here wherein the similarities between each of the user preference information B of the candidate users and the user preference information B of the using user are computed, but an arrangement may be made wherein not only the user preference information B but also the user preference information A is used in the similarity computations.

Thus, similarities between the using user and the candidate user are computed, and the users are sorted in order of greater similarity and displayed as an introducing user list on the browser. At this time, as described above, the introducing user presenting unit 38 creates an introduction reason based on the user preference information A of the introducing user, and displays the user that should be introduced along with the introduction reason.

The introduction reason is a feature of the preference of the introducing user, and for example, names of the top 3 elements having greater values from the various elements of the user preference information A are displayed. For example, in the case that the user 1 in FIG. 5 is an introducing user, the names of elements A2, A5, and A3 (e.g. content meta information such as artist name and genre, etc) are displayed as introduction reasons for the user 1.

Also, names of the top 10 elements having greater values from the various elements of the user preference information A of the using user are selected, and compared to the various elements of the introduction reason of the introducing user. In the case that there are common elements between the 10 elements selected from the various elements of the user preference information A of the using user and the 3 elements selected from the various elements of the user preference information A of the introducing user, the color is changed for such common elements when displayed as an introduction reason.

FIG. 7 shows an example of an introducing user list. In this example, the introducing user is displayed as "Mr. AAA", "Mr. BBB", "Mr. CCC" and so forth. The introduction reasons for the introducing user "Mr. AAA" are "element A1", "element A10", and "element A2", the introduction reasons for the introducing user "Mr. BBB" are "element A9", "element A2", and "element A8", and the introduction reasons for the introducing user "Mr. CCC" are "element A5", "element A8", and "element A3". In this case, let us say that the top 10 elements having greater values from the various elements of the user preference information A of the using user are element A2, element A5, element A6, element A7, element A10, element A11, element A12, element A13, element A14, and element A15.

Of the elements displayed in the introduction reason, those which are common with the 10 elements selected from the above-described user preference information A of the using user are element A2, element A5, and element A10, whereby the color of these elements are changed and displayed on the screen in FIG. 7. In this diagram, a color change is indicated by underlining the elements. By thus displaying, the features of the introducing user, the differences in preference between the using user and introducing user, and the same portions of similarity between the using user and introducing user can be understood at a glance.

In FIG. 7, in order to simplify the explanation, the introduction reasons are listed as "element A1", "element A10", "element A2", and so forth, but in reality these are the names of the various elements, and the artist name, genre, and so forth are displayed as introduction reasons.

Also, an arrangement may be made wherein elements of the user preference information B are displayed as the introduction reason.

Further, an arrangement may be made wherein, instead of changing the color of the introduction reason, the font is changed, or the text size is changed, or the display blinks.

Alternatively, an arrangement may be made wherein the introduction reason is not displayed in text, but is displayed as an image such as an icon corresponding to each element. In this case, for example instead of changing the color of the introduction reason, the image can be displayed as a moving image.

Figure 8:
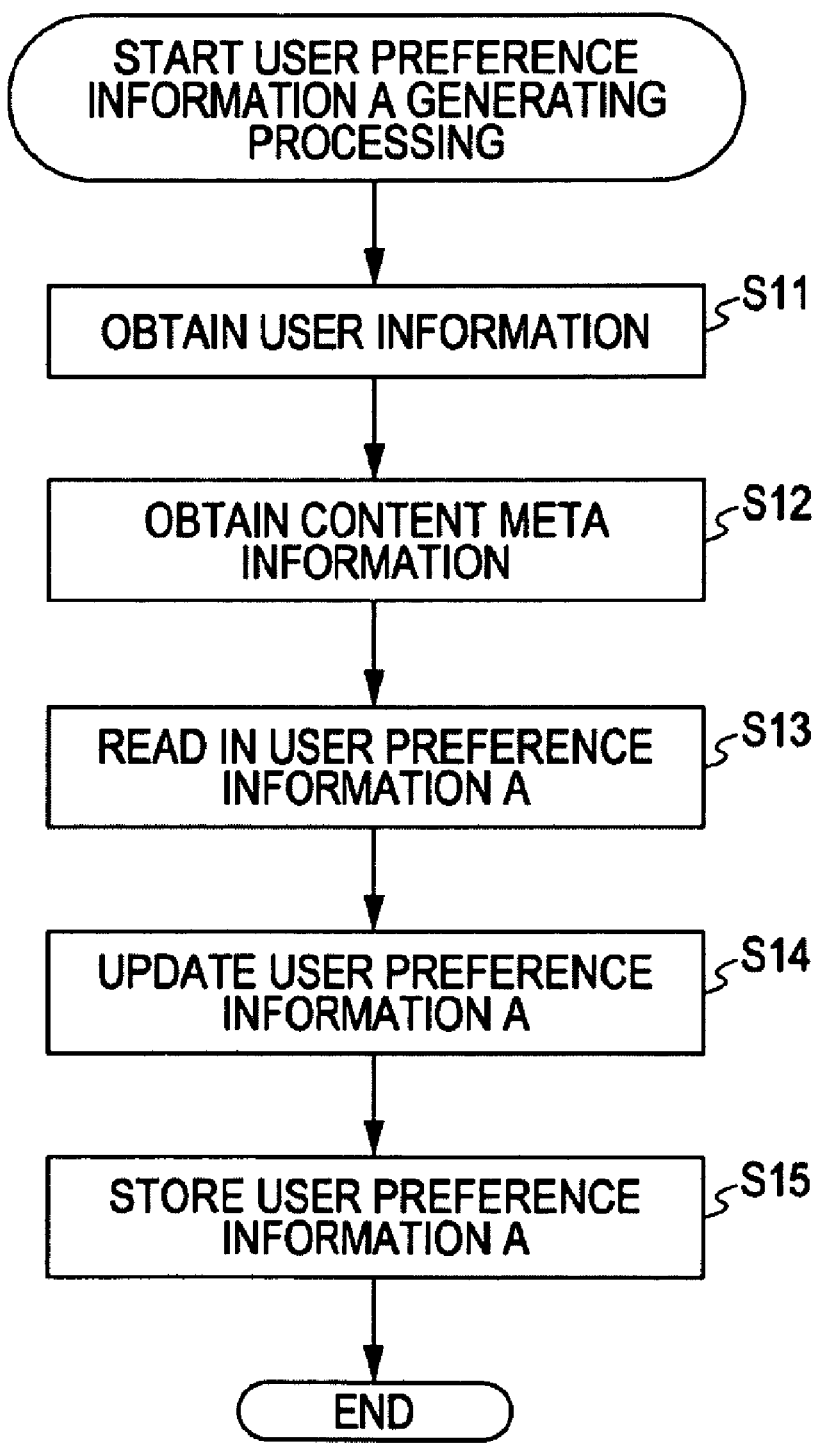
FIG. 8 is a flowchart describing an example of user preference information A generating processing.

Next, processing of the user preference information A with the user introducing system 10 will be described with reference to the flowchart in FIG. 8. This processing is executed when the user first uses the user introducing system 10 or when the user information is changed.

In step S11, the user information processing unit 32 in FIG. 1 obtains user information from a browser 31 installed on a personal computer of the user who accesses the content website. The user information includes information relating to the content website usage history (e.g. viewed pages) of the user and content that the user has disclosed.

In step S12, the user information processing unit 32 reads in content meta information from the content meta information database 33, based on information included in the obtained user information. At this time, the user information processing unit 32 identifies an ID for the content included in the user information, and obtains content meta information corresponding to the content.

In step S13, the user information processing unit 32 reads in the user preference information A of the user accessing the content website from the A preference information database 34. Note that in the case that the user is using the user introducing system 10 for the first time, the user preference information A is still not created, so in step S13, for example a form of user preference information A is read in.

In step S14, the user information processing unit 32 updates the user preference information A based on the user information obtained in step S11 and the content meta information obtained in step S12. Note that in the case that the user is using the user introducing system 10 for the first time, the user preference information A of the user is generated in step S14.

In step S15, the user preference information A that is updated or generated in the processing in step S14 is stored in the A preference information database 34. Thus, the user preference information A is generated.

Figure 9:
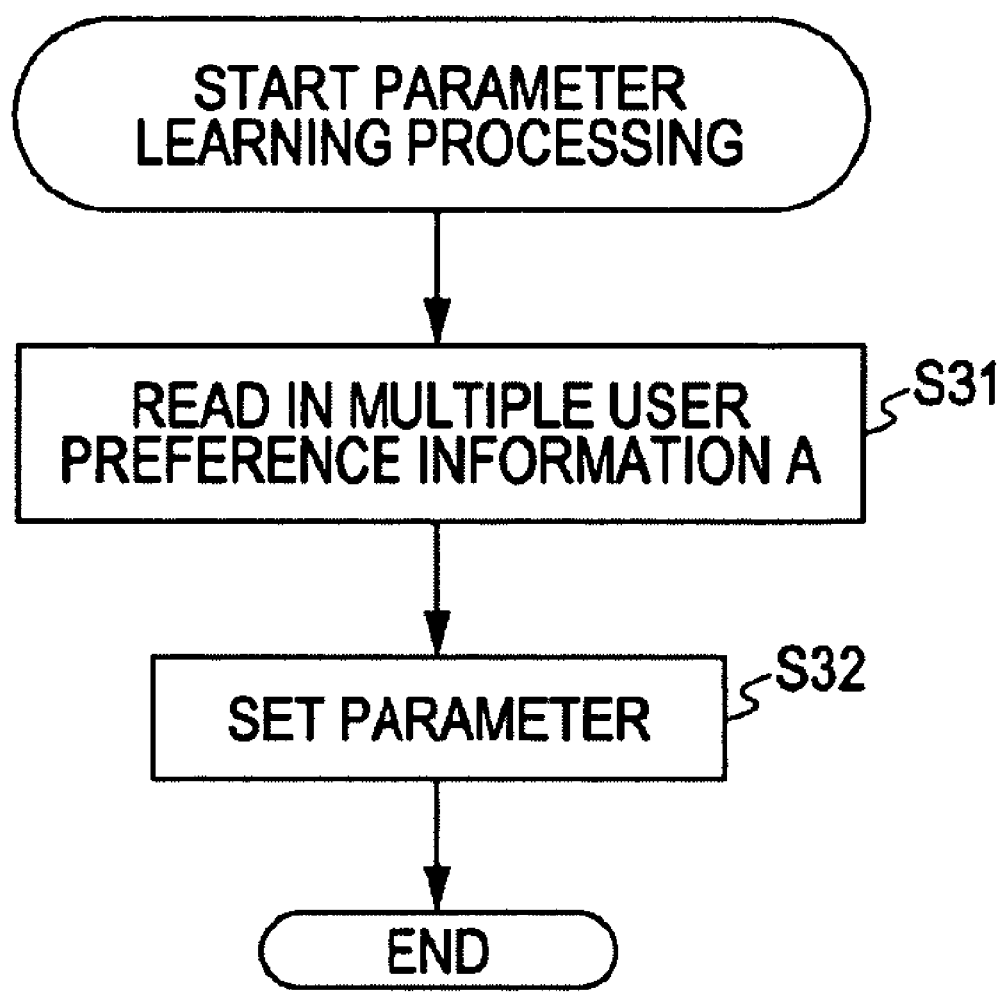
FIG. 9 is a flowchart describing an example of parameter learning processing.

Next, a parameter learning processing with the user introducing system 10 will be described with reference to the flowchart in FIG. 9. The processing is to learn the parameters of the above-described PLSA probability model, and for example is executed with the user preference information A stored in the A preference information database 34 reaches a predetermined number or higher.

In step S31, the user information analyzing unit 35 reads in and analyzes multiple user preference information A from the A preference information database 34, and sets parameters for a PLSA probability model in step S32. Parameter learning is thus performed.

Figure 10:
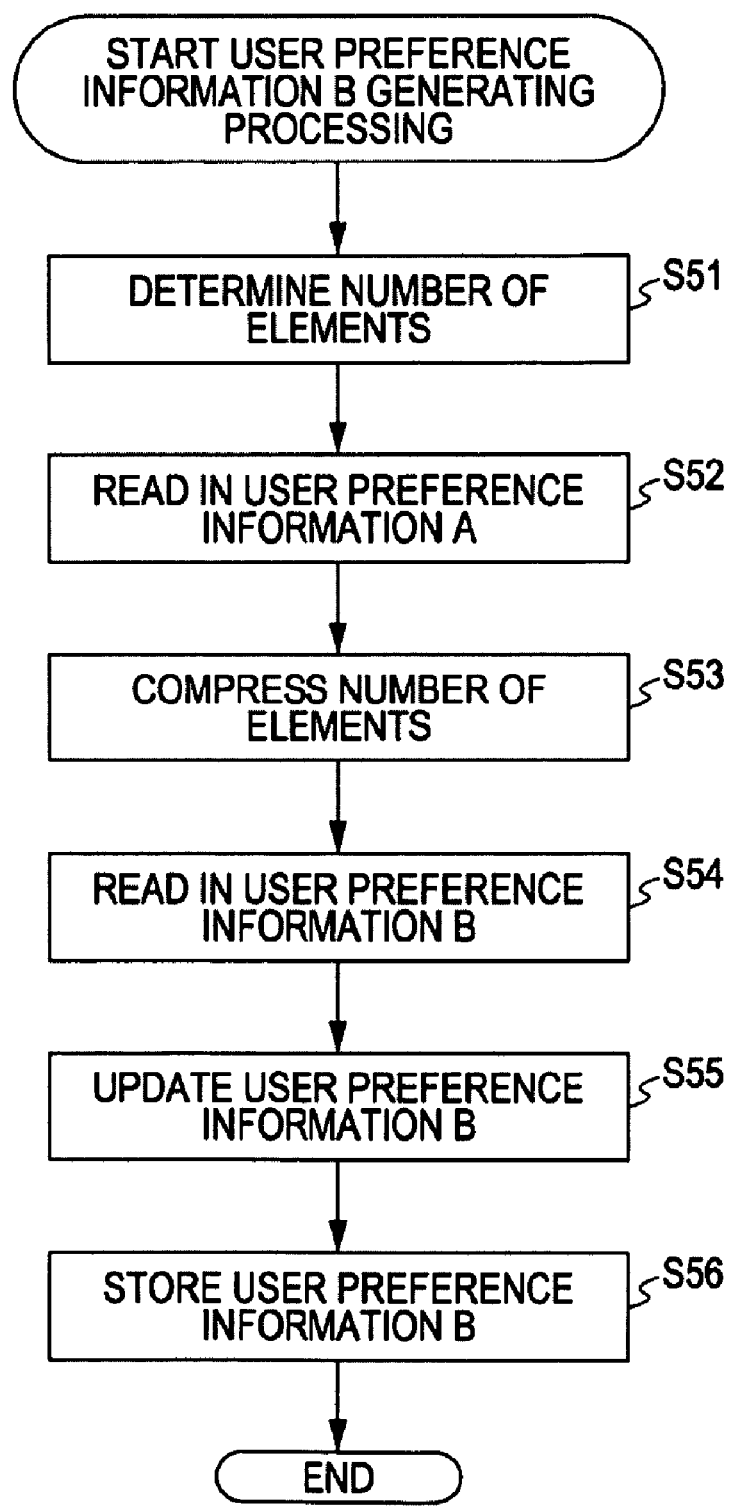
FIG. 10 is a flowchart describing an example of user preference information B generating processing.

Next, user preference information B generating processing with the user introduction system 10 is described with reference to the flowchart in FIG. 10. This processing is executed after the parameters are learned with the processing described above with reference to FIG. 9, using the parameters. Also, an arrangement may be made wherein the processing herein is executed when the user preference information A of the user is updated by executing the processing described above with reference to FIG. 8 when the user information is updated.

In step S51, the user information analyzing unit 35 determines the number of elements of the user preference information B. The number of elements may be arranged to be a predetermined value, or may be determined based on instructions from a system manager, for example.

In step S52, the user information analyzing unit 35 reads in the user preference information A from the A preference information database 34.

In step S53, the user information analyzing unit 35 performs analysis of the user preference information A read in with the processing in step S52 with PLSA (Probabilistic Latent Semantic Analysis), whereby the number of elements are compressed.

In step S54, the user information analyzing unit 35 reads in the user preference information B from the B preference information database 36. Note that in the case that the user preference information B of the user is not yet created, a form of the user preference information B is read in in step S54, for example.

In step S55, the user information analyzing unit 35 updates the user preference information B based on the processing results of the step S53. Note that in the case that the user preference information B of the user is not yet created, the user preference information B of the user is generated in step S55.

In step S56, the user preference information B that is updated or generated in the processing in step S55 is stored in the B preference information database 36. The user preference information B is thus generated.

Note that an arrangement may be made wherein the parameters of the PLSA probability model are learned along with executing the processing described above with reference to FIG. 10. That is to say, an arrangement may be made wherein, with the processing described above with reference to FIG. 9, the processing in FIG. 10 is not executed after the parameters are learned and by using such parameters, but rather the parameters are learned while executing the processing in FIG. 10.

Figure 11:
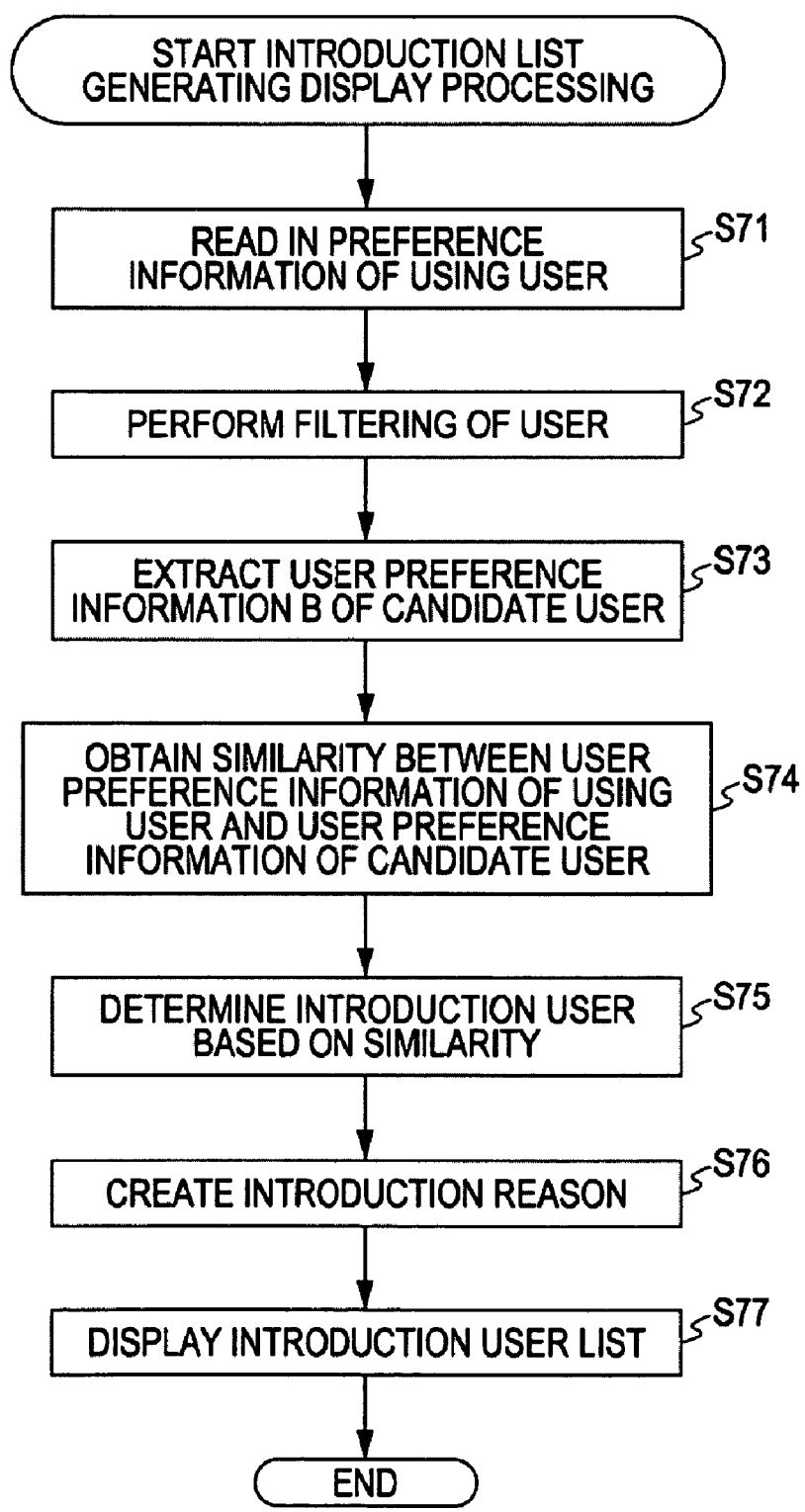
FIG. 11 is a flowchart describing an example of introduction list generating display processing.

Next, introducing list generating display processing with the user introducing system 10 will be described with reference to the flowchart in FIG. 11. This processing is executed when an introducing list display is commanded by the using user.

In step S71, the introducing user determining unit 37 reads in the user preference information A of the using user.

In step S72, the introducing user determining unit 37 performs user filtering based on the user preference information A of the using user read in in step S71. At this time, elements having a maximum value are searched from the user preference information A of the using user, and only users having a value of the user preference information A in such elements at or greater than a threshold value are extracted and become candidate users. Note that the processing in step S72 may be omitted.

In step S73, the introducing user determining unit 37 extracts the user preference information B of the candidate user obtained by the filtering in step 372 from the B preference information database 36.

In step S74, the introducing user determining unit 37 computes the similarities between the user preference information B of the using user and the user preference information B of the candidate user. At this time, for example, the similarity is computed as a sign inverted value of the Euclidian distance in the case that the user preference information B is a vector.

In step S75, the introducing user determining unit 37 determines an introducing user based on the similarities obtained from the processing in step S74. At this time, for example, determination is made such that the candidate user corresponding to the user preference information B of which the similarity is at or above a preset threshold value becomes the candidate user.

In step S76, the introducing user presenting unit 38 creates an introduction reason based on the user preference information A of the introducing user, for example.

In step S77, the introducing user presenting unit 38 displays the introducing user list on the browser of the using user, for example. At this time, for example, a screen such as that described above with reference to FIG. 7 is displayed on a screen of a personal computer or the like. A user introduction is thus performed.

With the above description, an example is described wherein the user preference information A and user preference information B are used primarily in order to identify an introducing user to introduce to a using user, but an arrangement may be made wherein the user preference information A and user preference information B are used in order to enable expressing the features of individual user preferences in an easily understandable manner.

For example, in the case that there are large numbers of introducing users, viewing each personal page of the introducing users takes time and effort. In reality, the using user is likely to view the personal page of each introducing user a short period of time and determine which introducing user personal page has the value to spend time viewing, and thereafter views again the personal pages of the small number of introducing users determined to have the value to spend time viewing.

Also, the user is likely to take interest, not only in users introduced by the system, but also in the degree of matching or difference between the features of another user preference features and the preference features of oneself, so being able to intuitively understand the user preferences features would be helpful.

By using the above-described user preference information A and user preference information B, the user preference features can be made to be intuitively understood.

Figure 12:
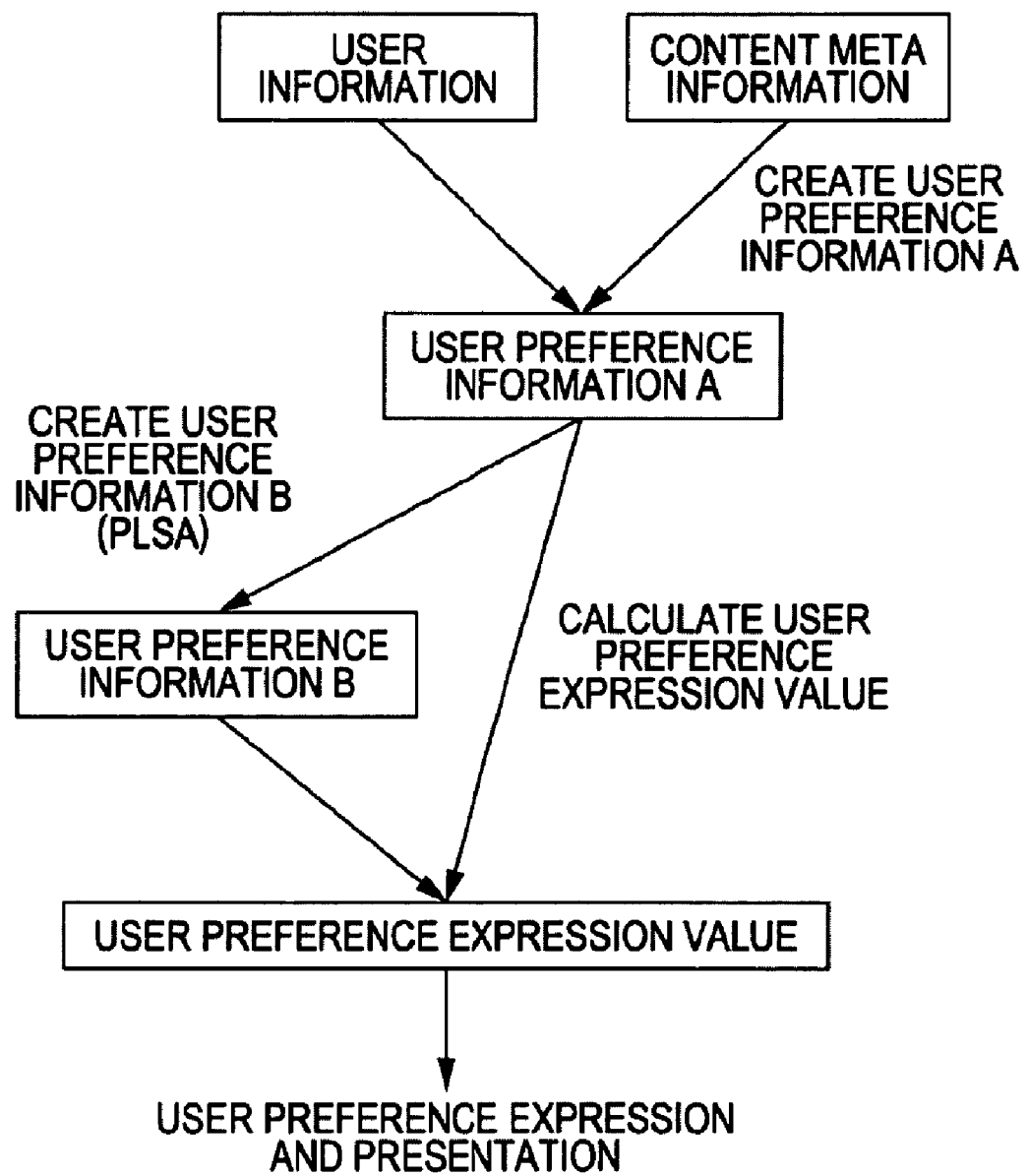
FIG. 12 is a diagram describing processing in the case of displaying the features of the user preferences so as to enable intuitively understanding, with the user introducing system.

FIG. 12 is a diagram describing the processing in the case of displaying the user preference features so as to be intuitively understood. As shown in FIG. 12, the user preference information A is generated based on the user information and content meta information. By performing PLSA analysis for the user preference information A, the user preference information B which is a vector having the number of elements compressed is generated. Up to this point, the processing is similar to the case described above with reference to FIG. 2.

A certain user preference expression value is calculated, for example, based on the user preference information A and the user preference information B. A preference expression value is a value used for the purpose of expression so that the user preference features can be intuitively understood. Details of the preference expression value will be described later.

Further, based on the calculated preference expression value, the user preference features are expressed so as to be intuitively understood, and presented (displayed).

Figure 13:
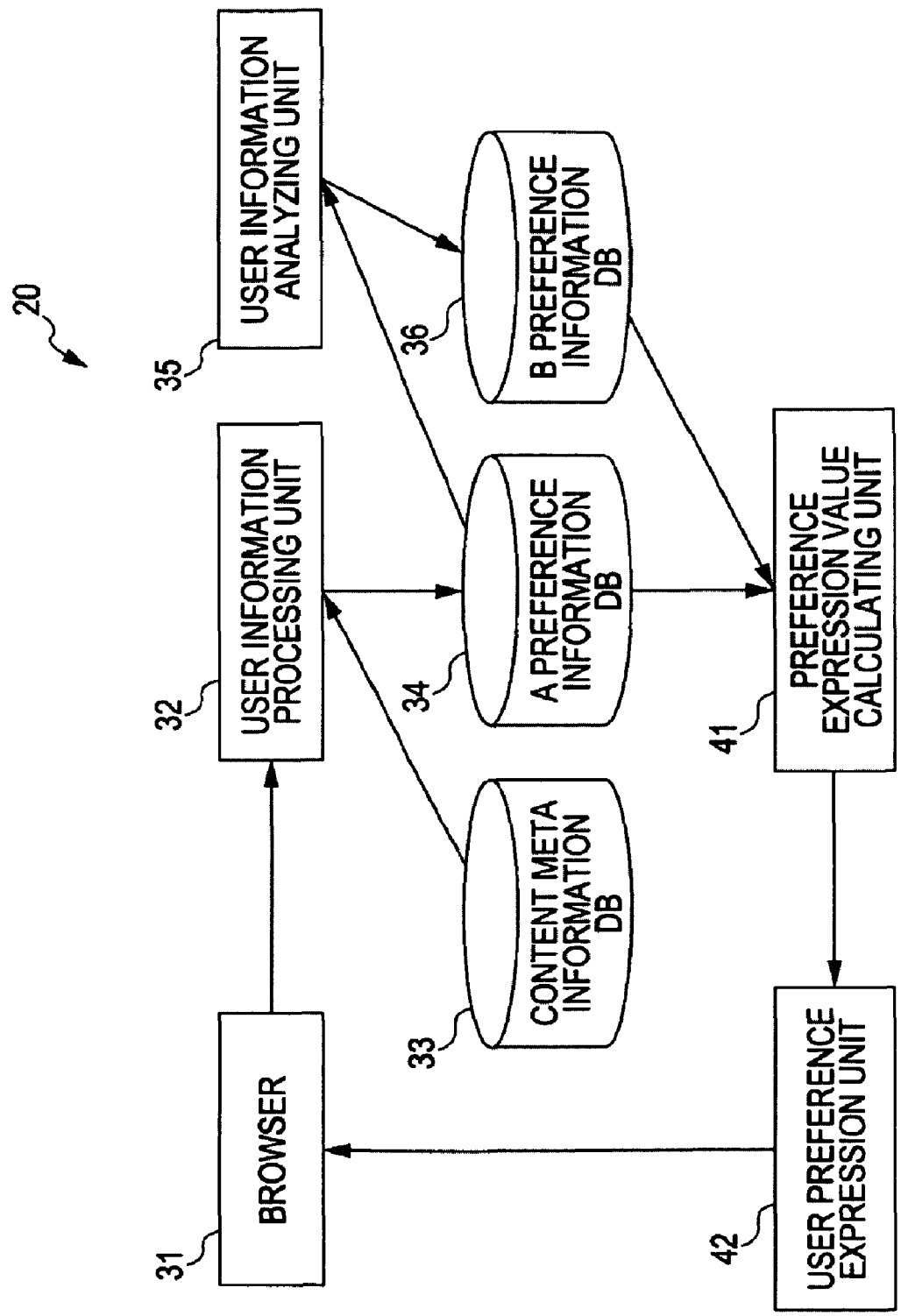
FIG. 13 is a block diagram illustrating another configuration example of the user introducing system according to an embodiment of the present invention.

FIG. 13 is a block diagram showing a configuration example of a user introducing system 20 in the case of displaying the user preference features so as to be intuitively understood. FIG. 13 is a diagram corresponding to FIG. 1, and the portions corresponding to FIG. 1 have the same reference numerals denoted.

Similar to the user introducing system 10, the user introduction system 20 is also configured as a server connected to a network such as the Internet, for example. Note that an arrangement may be made wherein the user introducing system 20 is made up of multiple servers which are mutually connected. Otherwise, the introducing user and using user of the user introducing system 20 are similar to the case of the user introducing system 10.

Also, the introducing user determining unit 37 and introducing user presenting unit 38 of the FIG. 1 are not provided on the user introducing system 20, but an arrangement may be made wherein, for example, the preference expression value calculating unit 41 is installed as a portion of the introducing user determining unit 37, and the user preference expressing unit 42 is installed as a portion of the introducing user presenting unit 38.

The browser 31 through B preference information database 36 in FIG. 13 are similar to the case in FIG. 1 so the detailed description thereof will be omitted.

A preference expression value calculating unit 41 calculates the preference expression value based on the user preference information B stored in the B preference information database 36 or the user preference information A stored in the A preference information database 34.

The preference expression value is a value for each element of the user preference information B, for example. As described above, the user preference information B is a lower-dimension vector generated by the number of elements of the user preference information A, which is a high-dimension sparse vector, being compressed. Therefore, for example with the elements of the user preference information A, even in the case that there is a gap between both values, there may be cases wherein determination can be made that the preferences are similar if the user preference information B is reference, thereby enabling the user preferences to be more simply and accurately compared.

For example, in the case that the elements A1 through A3 of the user preference information A of a certain user each corresponds to the content meta information of "jazz", "classical", "bosanova", an element B1 having a high occurrence probability of the elements A1 through A3 is generated in the user preference information B. In this case, for example instead of expressing the user preference features as "jazz 1", "classical 2", "bosanova 3", naming the element B1 as "mature" and expressing this as "mature 1.5" may enable the user preference features to be more intuitively understood.

Also, for example in the case that there is a large number of elements in the user preference information B, the preference expression value may be computed as follows. For example, in the case that the preference expression value is generated as a two-dimensional vector (preference expression value 1, preference expression value 2), an arrangement may be made wherein the preference expression value 1 of the user is calculated as a sum of the elements A1 through A4 of the user preference information A and the elements B1 and B2 of the user preference information B, and the preference expression value 2 is calculated as a sum of the elements A5 through A8 of the user preference information A and the elements B3 and B4 of the user preference information B.

Alternatively, an arrangement may be made wherein PLSA analysis is further performed for the user preference information B to generate a vector with fewer elements, wherein each element value of the vector becomes the element value making up a vector for the preference expression value.

Further, an arrangement may be made wherein a predetermined element of the user preference information A and a predetermined element of the user preference information B are extracted, and each of the element values are element values making up the vector of the preference expression value. For example, in the case that the user preference information A is made up of the elements A1 through A8 and the user preference information B is made up of elements B1 through B4, vector of the preference expression value may be a vector (element A1, element B2, element B3, element B4).

Based on the preference expression value thus obtained, the user preference expression unit 42 displays a screen showing the user preference features on the browser 31.

Figure 14:
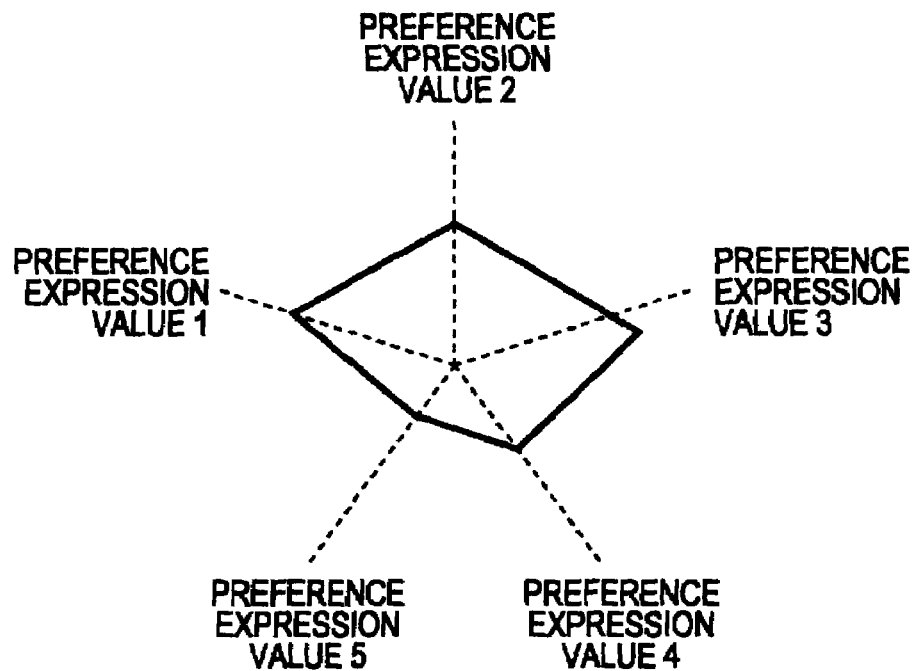
FIG. 14 is a diagram illustrating an example of a screen showing user preference features.

FIG. 14 is a diagram showing an example of a screen showing the user preference features generated with the user preference expression unit 42. In the example in FIG. 14, the example is of a case wherein the preference expression value is configured as a 5-dimensional vector, and the preference expression value 1 through preference expression value 5 which are vector elements are each an axis, whereby the preference expression value is displayed as a 5-sided graph.

Figure 15:
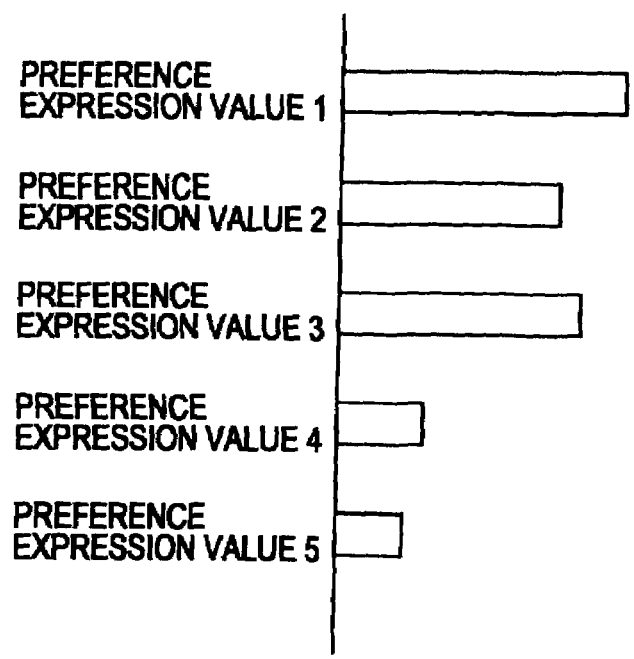
FIG. 15 is a diagram illustrating another example of a screen showing user preference features.

FIG. 15 is a diagram showing another example of a screen expressing the user preference features generated with the user preference expression unit 42. In the example in FIG. 15, the example is of a case wherein the preference expression value is configured as a 5-dimensional vector, and the preference expression value 1 through preference expression value 5 which are vector elements are each an axis, whereby the preference expression value is displayed as a bar graph. Thus, the user preference features can be more intuitively understood.

Figure 16:
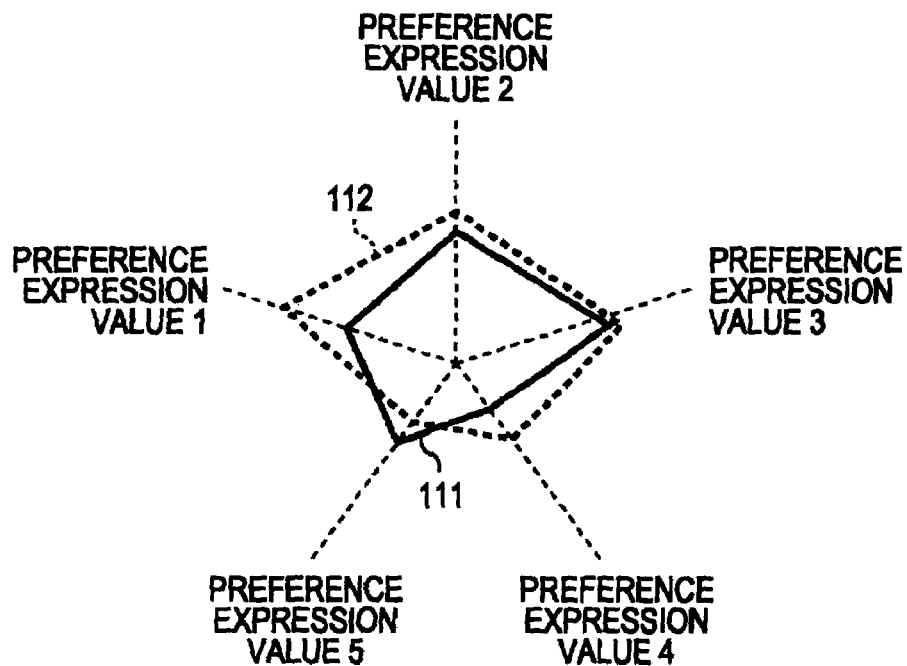
FIG. 16 is a diagram illustrating yet another example of a screen showing user preference features.

Alternatively, an arrangement may be made wherein the preference expression values of multiple users are displayed in a layered manner. FIG. 16 is a diagram showing another example of a screen expressing the user preference features generated with the user preference expression unit 42. In the example in FIG. 16, the example is of a case wherein the preference expression value is configured as a 5-dimensional vector, and the preference expression value 1 through preference expression value 5 which are vector elements are each an axis, whereby the preference expression value for the two users are each displayed as a 5-sided graph.

In FIG. 16, for example, the graph shown with dotted line 112 expresses the preference features of the using user (oneself), and the graph shown with line 111 expresses the preference features of the introducing user (another person).

Figure 17:
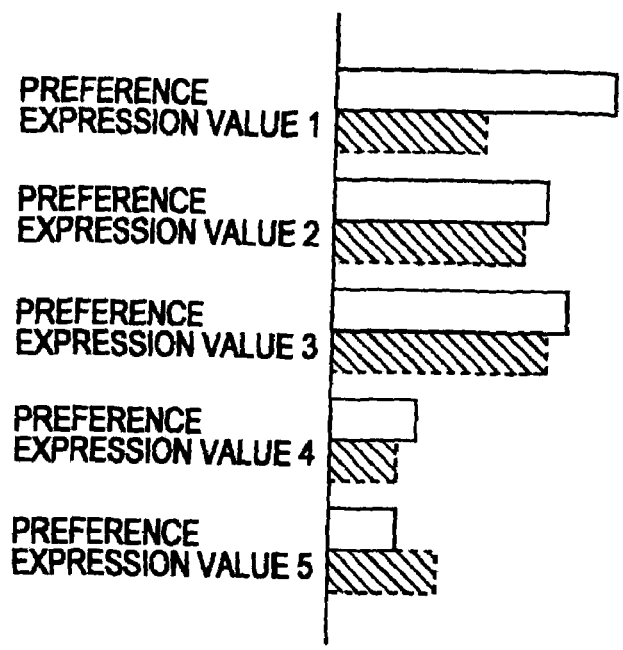
FIG. 17 is a diagram illustrating yet another example of a screen showing user preference features.

FIG. 17 is a diagram showing yet another example of a screen showing the user preference features generated with the user preference expression unit 42. In the example in FIG. 17, the example is of a case wherein the preference expression value is configured as a 5-dimensional vector, and the preference expression value 1 through preference expression value 5 which are vector elements are each an axis, whereby the preference expression value for the two users are each displayed as a bar graph.

In FIG. 17, for example, the bar graph shown with white bars expresses the preference features of the using user (oneself), and the bar graph shown with hatching expresses the preference features of the introducing user (another person). Thus, the degree of matching each user preference feature, or the difference in the preference features, can be more intuitively understood.

Further, along with a screen wherein the preference expression values are graphed as described above, a limited number of the names of elements of the user preference information A or user preference information B or of the elements having a greater value of both are displayed as user features, whereby preference expressions can be made in greater detail.

For example, 10 elements having a large value are selected from the user preference information A of the using user, and 6 elements having a large value are selected from the user preference information A of the introducing user. In order to express the preference features of the introducing user in a more intuitive manner, displaying the names of the 6 extracted elements in size according to the size of the element values is effective.

In the case that there are common elements between the 10 elements selected from the various element of the user preference information A of the using user and the 6 elements selected from the various elements of the user preference information A of the introducing user, the common elements displayed as introduction reasons are displayed with a different color.

Figure 18:
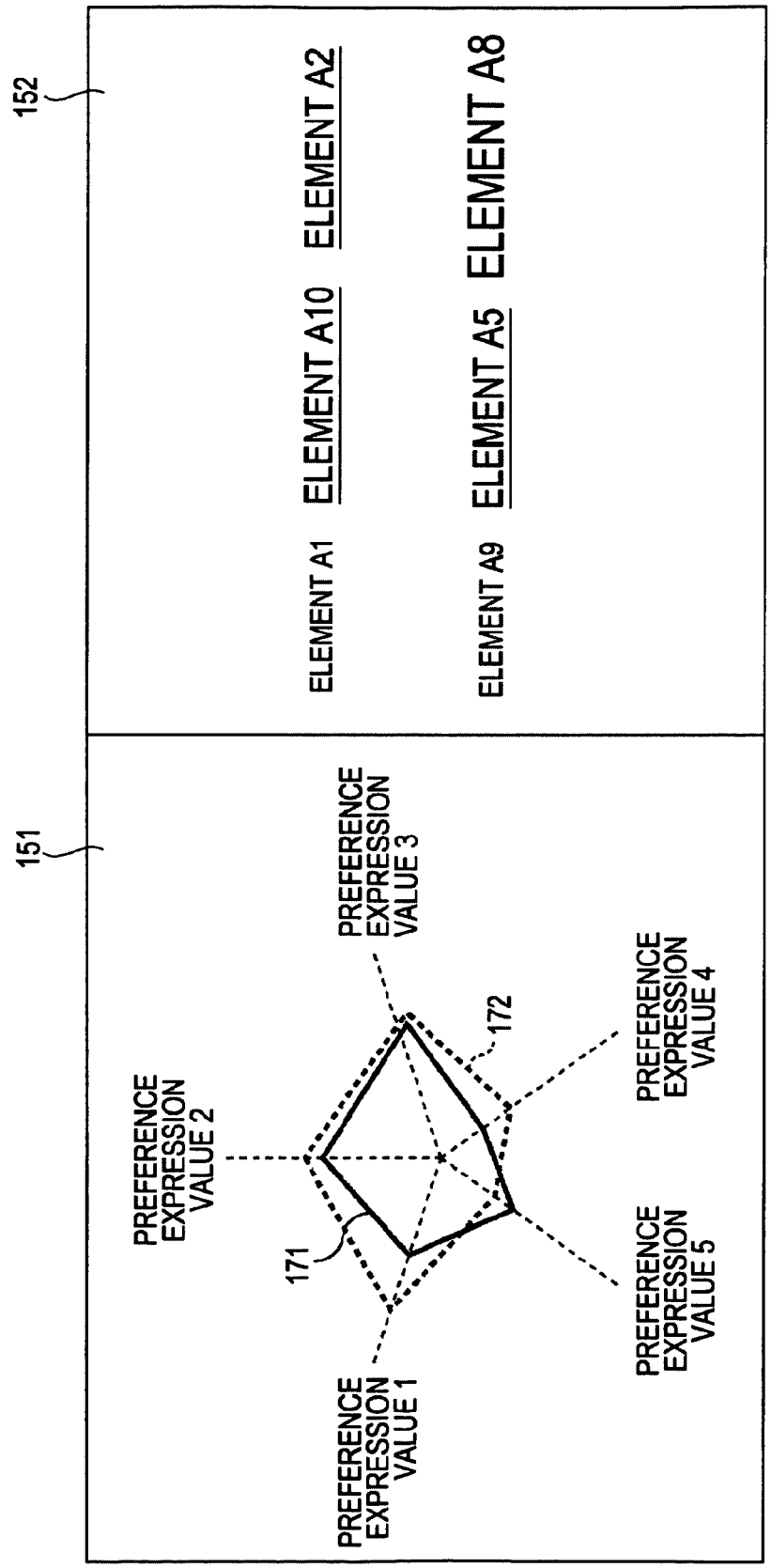
FIG. 18 is a diagram illustrating yet another example of a screen showing user preference features.

FIG. 18 is a diagram showing yet another example of the screen expressing the user preference features generated with the user preference expression unit 42. In the case of FIG. 18, for example, the screen example is of a case of presenting the preference features of an introducing user to the using user, wherein a region 151 in the diagram displays the preference expression value of the using user and the introducing user as a graph, and a region 152 displays the preference features of the introducing user in a different method from the display in the region 151.

In the example in FIG. 18, the example is of a case wherein the preference expression value is configured as a 5-dimensional vector, and the preference expression value 1 through preference expression value 5 which are vector elements are each an axis, whereby the preference expression value for the two users are displayed in the region 151 as a 5-sided graph. Also in FIG. 18, for example, a graph shown with dotted line 172 expresses the preference features of the using user, and the graph shown with line 171 expresses the preference features of the introducing user.

Also, with the example in FIG. 18, the top 6 elements having greater values are extracted from the preference information A of the introducing user, and displayed as an introducing user feature in the region 152. In the example in FIG. 18, "element A1", "element A2", "element A5", "element A8", "element A9", and "element A10", are displayed. In order to simplifying the description, the introduction reasons are described as "element A1", "element A2", and so forth, but in reality there are names for each element, and introduction reasons such as artist name and genre will be displayed.

Further with the example in FIG. 18, the names of the 6 extracted elements are displayed in a size according to the size of the element values. With this example, the value of "element A8" was the greatest and the value of "element A1" was the smallest.

Also, with the example in FIG. 18, in the case that there are common elements between the 10 elements selected from the various elements of the user preference information A of the using user and the 6 elements selected from the various elements of the user preference information A of the introducing user, the common elements displayed in the region 152 are displayed with the color thereof changed. In FIG. 18, a color change display is expressed by displaying the elements with an underline. In this case, the "element; A2", "element A5", and "element A10" are elements common to the 10 elements selected from the various elements of the user preference information A of the using user and the 6 elements selected from the various elements of the user preference information A of the introducing user.

Further, an arrangement may be made wherein, instead of changing the color in the region 152, the font is changed, or the text size is changed, or the display blinks.

Alternatively, an arrangement may be made wherein the display in the region 152 is not made in text, but is displayed as an image such as an icon corresponding to each element. In this case, for example instead of changing the color of each element, the image can be displayed as a moving image.

Also, description has been given here using an example to graph the preference expression values with a multi-sided graph or bar graph as a screen to express the user preference features, but a screen expressing the user preference expression values is not limited to these graphs, and the preference expression values are not necessarily to be graphed.

For example, as a screen expressing the user preference features, an arrangement may be made wherein an image of a character is displayed, and the displayed character is changed according to the value of each element of the preference expression value vector, or the facial expression of the character is changed according to the value of each element of the preference expression value vector. Also, the form, color, or movement of a shape serving as the user preference features can be changed according to the values of the various elements of the preference expression value vector.

Thus, the preference features of the introducing user, the differences in preference features between the using user and introducing user, and the portions having the same preference features between the using user and introducing user can be understood at a glance.

Figure 19:
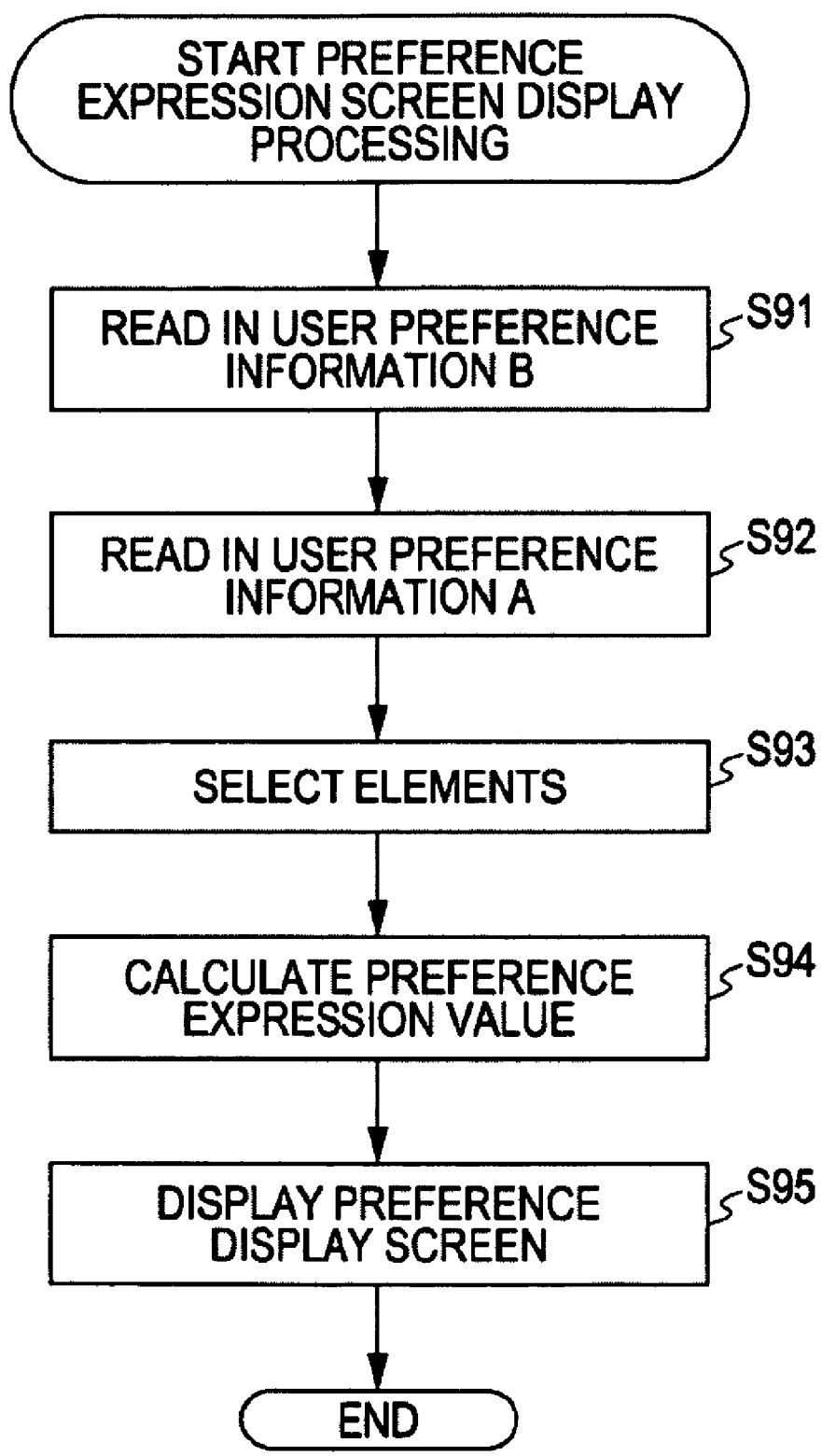
FIG. 19 is a flowchart describing an example of preference expression screen display generating processing.

Next, preference expression screen generating display processing with the user introducing system 20 will be described with reference to the flowchart in FIG. 19. An arrangement may be made wherein the processing is executed when a screen display expressing a predetermined user preference feature is requested, or executed along with the processing described above with reference to FIG. 11 when an introducing list display is commanded by the using user.

In step S91, the preference expression value calculating unit 41 reads in the user preference information B from the B reference information database 36. Note that when there are multiple users for which a screen showing preference features (preference expression values) should be displayed, the user preference information B corresponding to the multiple users is read in.

In step S92, the preference expression value calculating unit 41 reads in the user preference information A from the A reference information database 34. Note that when there are multiple users for which a screen showing preference features (preference expression values) should be displayed, the user preference information A corresponding to the multiple users is read in. Note that in the case that the user preference information A is not used in the preference expression value calculations, the processing in step S92 may be omitted.

In step S93, the preference expression value calculating unit 41 selects elements necessary for the preference expression value calculations from the elements of the user preference information B read in with the processing in step S91 and the elements of the user preference information A read in with the processing in step S92.

In step S94, the preference expression value calculating unit 41 calculates the preference expression values based on the elements selected in the processing in step S93. As described above, an arrangement may be made wherein, at this time for example, each of the values of the elements making up the preference expression value vector become the values of the elements of the user preference information B, or one element of a preference expression value (e.g. preference expression value 1) may be calculated as a sum of the multiple elements of the user preference information A, or a sum of the multiple elements of the user preference information B, or a sum of the multiple (or singular) elements of the user preference information A and the multiple (or singular) elements of the user preference information B.

Alternatively, an arrangement may be made wherein PLSA analysis is performed for the user preference information B with the user information analyzing unit 35, a vector with fewer elements is generated, and each value of the elements of the vector become the values of the elements making up the preference expression value vector.

Further, an arrangement may be made wherein predetermined elements of the user preference information A and predetermined elements of the user preference information B are extracted, and each of such element values become the values of the elements making up the preference expression value vector.

In step S95, the user preference expressing unit 42 displays a screen which is a preference expressing screen for displaying the user preference features and which is a screen such as that described with reference to FIGS. 14 through 18 on a screen of a personal computer of a user or the like. The preference expression screen is thus displayed.

With the description above, an example is described of the case wherein an introducing user is determined based on the similarity between the user preference information B of the using user and the user preference information B of each of the candidate users, and an introducing user list is displayed. That is to say, an example is described above of introducing a user based on user preference information.

However, by applying the present information, a user can be introduced based on content meta information, for example. For example if the content meta information is configured to have a high-dimension real number value vector, similar as with the user preference information A, and the content meta information thereof is compressed, and similar to the example described above, the introducing user can be determined based on the similarity between the compressed content meta information and the user preference information B of each of the candidate users.

Figure 20:
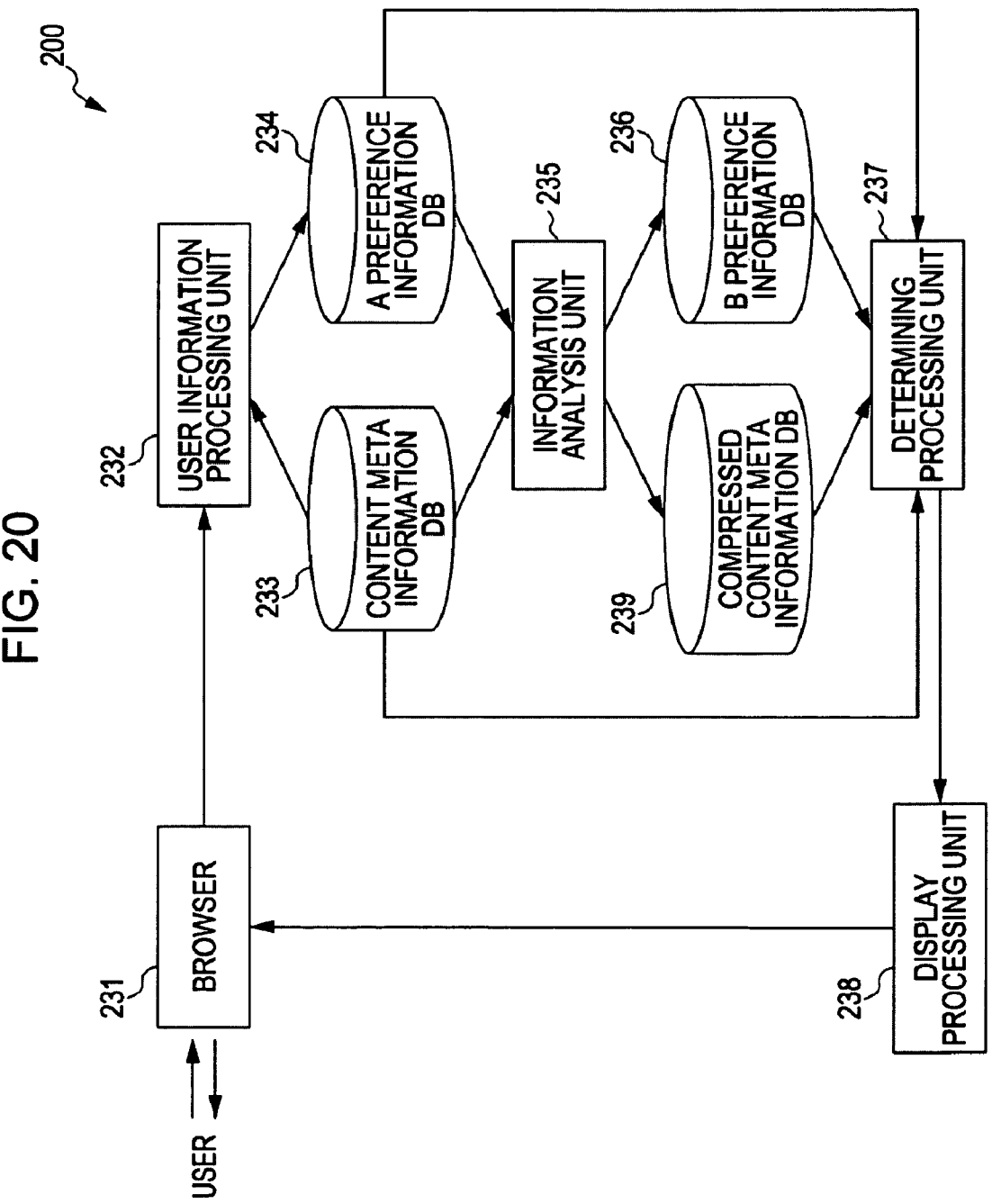
FIG. 20 is a block diagram illustrating another configuration example of a user introducing system according to an embodiment of the present invention.

FIG. 20 is a block diagram showing another configuration example of the user introducing system according to an embodiment of the present invention. The user introducing system 200 is configured as a content website providing an SNS (social networking service). A content website provides media content such as music, movies, videos, television programs, and written works and content such as product sales, and also provides services to introduce a certain user to another user.

The user introducing system 200 differs from the case of the user introducing system 10 in FIG. 1, and for example is configured so that a user can be introduced based on predetermined content meta information.

With the user introducing system 200, similar to the case of the user introducing system 10 in FIG. 1, a personal page is provided for each user accessing a content website via a browser installed in a personal computer or the like, for example. A personal page is content information that the user discloses, and for example lists content information such as favorite music, movies, and so forth. The user of the user introducing system 200 uses the browser installed on the personal computer of the user, accesses the content website via a network such as the Internet, and views pages within the content website or pages linked to the content website.

The user introducing system 200 is configured as a server connected to a network such as the Internet, for example, similar to the case of the user introducing system 10. Note that an arrangement may be made wherein the user introducing system 200 is made up of multiple servers mutually connected.

The user information processing unit 232 obtains user information from a browser 231 installed in the personal computer or the like of a user accessing the content website which is a user having the above-described personal page, similar to the user information processing unit 32 in FIG. 1. Upon obtaining the user information from the browser 231, the user information processing unit 232 reads in the content meta information from the content meta information database 233 based on information included in the obtained user information.

A unique ID for each content and content meta information are correlated and stored in the content meta information database 233, similar to the content meta information database 33 in FIG. 1, and the user information processing unit 232 identifies the content ID included in the user information and obtains the content meta information corresponding to such content.

Note that the content meta information stored in the content meta information database 233 becomes a high-dimension vector having multiple elements, similar to the user preference information A stored in the A preference information database 234.

Also, the user information processing unit 232 generates the user preference information A based on the user information obtained from the browser 231 and the content meta information obtained from the content meta information database 233, similar to the case in FIG. 1. The user preference information A is generated for each of multiple users, and the generated user preference information A is stored in the A preference information database 234.

The information analyzing unit 235 reads in and analyzes the user preference information A from the A preference information database 234, and generates the user preference information B, similar to the user information analyzing unit 35 in FIG. 1. The user preference information B becomes a vector wherein the number of elements of the user preference information A is compressed (reduced), and the information analyzing unit 235 generates a vector with compressed number of elements by performing analysis with a multi-topic model. The user preference information B is generated for each of the multiple users, and the generated user preference information B is stored in the B preference information database 236.

Also, the information analyzing unit 235 reads in and analyzes the content meta information from the content meta information database 233, and generates the compressed content meta information. The compressed content meta information becomes a vector wherein the number of elements of the content meta information is compressed (reduced), and the information analyzing unit 235 generates a vector with compressed number of elements by performing analysis with a multi-topic model. The compressed content meta information is generated for each of the multiple contents, and the generated compressed content meta information is stored in the compressed content meta information database 239.

That is to say, the information analyzing unit 235 compressed the user preference information while also compressing the content meta information. Note that the content meta information stored in the content meta information database 233 is configured as a same-dimensional vector having the same elements as the user preference information A stored in the A preference information database 234. Also, the compressed content meta information stored in the compressed content meta information database 239 is configured as a same-dimensional vector having the same elements as the user preference information B stored in the B preference information database 236.

Note that a method to obtain the occurrence probability of a word or text, such as PLSA (Probabilistic Latent Semantic Analysis), LDA (Latent Dirichlet Allocation), and so forth, can be given as an example of an analyzing method for a multi-topic model with the information analyzing unit 235.

FIG. 21 is a diagram showing an example of the content meta information of the contents 1 through 3, and FIG. 22 is a diagram showing an example of the compressed content meta information generated by performing analysis with PLSA as to the content meta information in FIG. 21. An example is described here for converting the content meta information which is a 5-dimensional vector into compressed content meta information which is a 3-dimensional vector in order to simplify the description, but in reality the content meta information and the compressed content meta information are both high-dimensional vectors.

In this case, with the information analyzing unit 235, a PLSA probability model wherein the topic number is 3 and the parameters are determined beforehand is prepared, and the occurrence probability of the elements A1 through A5 of the content meta information is obtained. With the first topic the occurrence probability of the elements A1 and A2 are high, and with the second topic the occurrence probability of the elements A3 and A4 are high. That is to say, the elements A1 and A2 are similar elements, and the elements A3 and A4 are similar elements.

In this case, the first through third topics correspond to the elements B1 through B3 in FIG. 22, so the compressed content meta information of the content 1 having a relatively large value of element A2, and the compressed content meta information of the content 2 having a relatively large value of element A1, the value of the element B1 thereof is a relatively large value. This is because the elements A1 and A2 are similar elements. Also, the value of the elements A3 and A4 of the content meta information in contents 1 through 3 are "0", so with the compressed content meta information of the contents 1 through 3, the value of the element B2 is "0" for each. This is because the elements A3 and A4 are similar elements. Further, with the compressed content meta information of the contents 1 and 3 wherein the value of the element A5 is relatively large has a relatively large value of the element B3 value.

Thus, the content meta information which is a high-dimensional sparse vector can be converted (generated) into compressed content meta information which is a lower-dimension vector. Thus, by generating the compressed content meta information, the content features can be compared in a more simple and accurate manner.

Note that the compressed content meta information is generated so that the number of elements of the vector of the compressed content meta information for each user becomes the same, regardless of the content meta information.

Returning to FIG. 20, similar to the introducing user determining unit 37 in FIG. 1, the determining processing unit 237 filters the user preference information A or the user preference information B for each of the multiple users having a personal page on the user introducing system 200, based on the user preference information A of the user of the browser 231, identifies a user corresponding to the user preference information A or user preference information B obtained as a result of filtering, and extracts the user preference information B of the identified users.

The determining processing unit 237 computes the similarity between each of the extracted user preference information B and the user preference information B of the user of the browser 231, and determines the user that should be introduced to the user of the browser 231 based on the similarities thereof.

Also, the determining processing unit 237 identifies the compressed content meta information corresponding to the content ID input via the browser 231, and extracts the user preference information B for each of the multiple users having a personal page on the user introducing system 200.

The determining processing unit 237 computes the similarities between the compressed content meta information corresponding to the input content ID and each of the extracted user preference information B, and determines a user that should be introduced to the user of the browser 231 based on the similarities thereof.

That is to say, the determining processing unit 237 not only receives input of the user preference information B and computes the similarities with other user preference information B, but also can receive input of the compressed content meta information and perform computations of similarities with the user preference information B.

The similarity is computed, for example, as a sign inverted value of the Euclidian distance between a vector of the user preference information B of a certain candidate user and a vector of the compressed content meta information. Note that the similarity is not limited to computation based on Euclidian distance, e.g. may be computed as the inner product of the vector.

Description has been given here wherein the similarities between the user preference information B of each of the candidate users and the compressed content meta information is computed, but an arrangement may be made wherein, for example not only the user preference information B but also the user preference information A is used.

A presenting processing unit 238 is configured so as to display an introducing user list that displays a user that should be introduced, which is determined with the determining processing unit 237, along with the introduction reason. The presenting processing unit 238 sorts the users in the order of greater similarity, and displays this as an introducing user list on the browser. At this time, as described above, the presenting processing unit 238 creates an introduction reason based on the user preference information A of the introducing user, and displays the user that should be introduced, along with the introduction reason. That is to say, the presenting processing unit 238 is arranged such that an introducing user list such as that described above with reference to FIG. 7, for example, is generated and displayed. Thus, according to the present invention, a user can also be introduced based on content meta information.

The user preference information A generating processing, parameter learning processing, and user preference information B generating processing with the user introducing system 200 in FIG. 20 are similar processing to the processing described above with reference to FIGS. 8 through 10, respectively, so the detailed descriptions thereof will be omitted.

Figure 23:
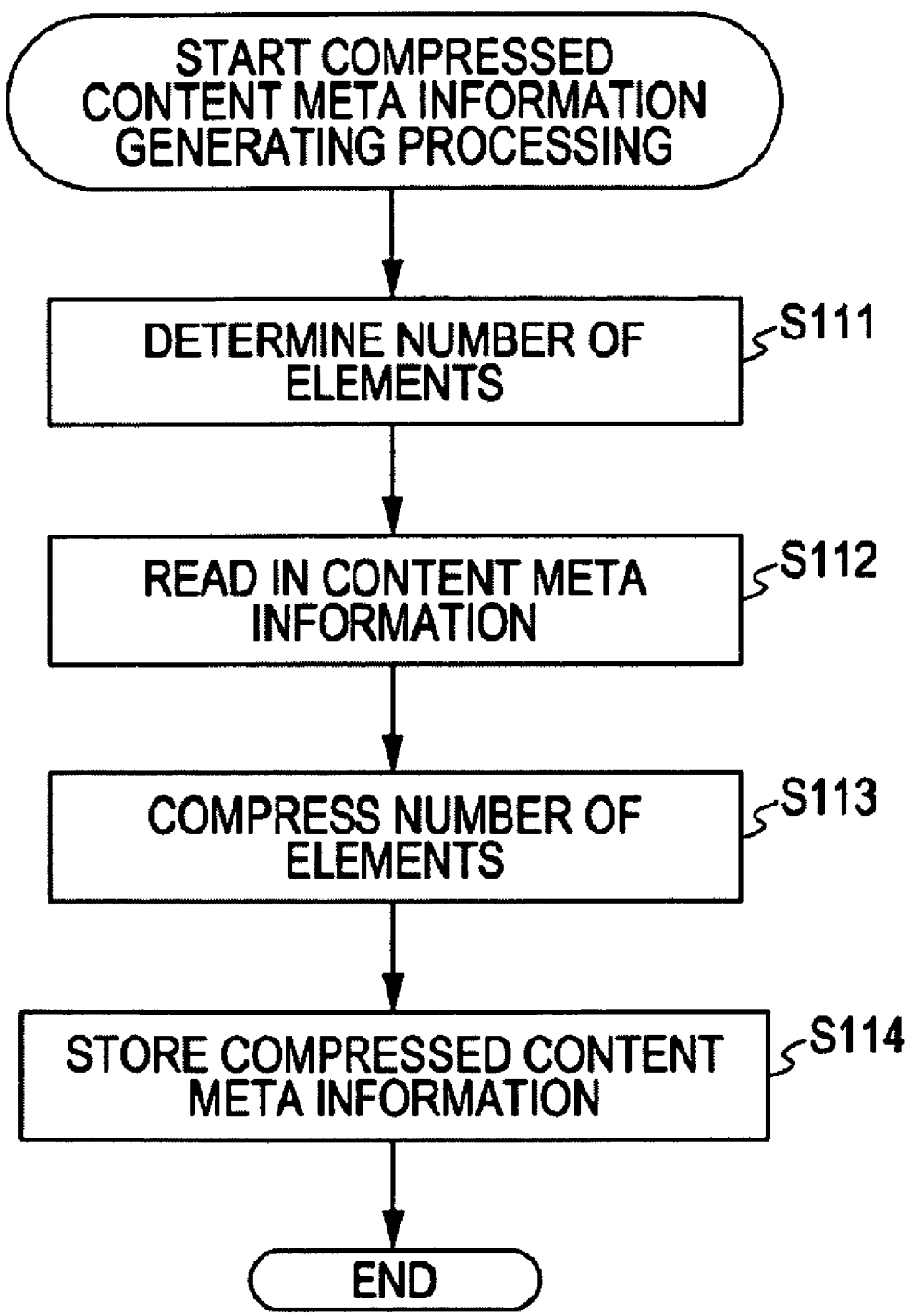
FIG. 23 is a flowchart describing an example of compressed content meta information generating processing.

Next, the compressed content meta information generating processing with the user introduction system 200 in FIG. 20 will be described with reference to the flowchart in FIG. 23.

This processing is executed using parameters, after which such parameters are learned with the processing described above with reference to FIG. 9.

In Step S111, the information analyzing unit 235 determines the number of elements of the compressed content meta information. The number of elements may be a predetermined value, or for example may be determined based on a command from a system manager or the like.

In step S112, the information analyzing unit 235 reads in the content meta information from the content meta information database 233.

In step S113, the information analyzing unit 235 compressed the number of elements for the content meta information read in with the processing in sep S112, by performing analysis with PLSA (Probabilistic Latent Semantic Analysis), for example. In reality, compression of the number of elements will be performed for each of the content meta information stored in the content meta information database 233, by performing analysis with PLSA, for example.

In step S114, the information analyzing unit 235 stores the content meta information, wherein the elements are compressed with the processing in step S113, in the compressed content meta information database 239. Thus, the compressed content meta information is generated.

Note that an arrangement may be made wherein, along with the executing of the processing described above with reference to FIG. 23, the parameters of the PLSA probability model can be learned. That is to say, an arrangement may be made wherein, with the processing described above with reference to FIG. 9, the processing is FIG. 23 are not executed using the parameters after the parameters are learned, but rather the parameters can be learned which executing the processing in FIG. 23.

With the user introducing system 200 in FIG. 20, the introducing list generating display processing in the case of introducing a user based on the user preference information is similar processing as the processing described above with reference to FIG. 11, so detailed descriptions thereof will be omitted.

Figure 24:
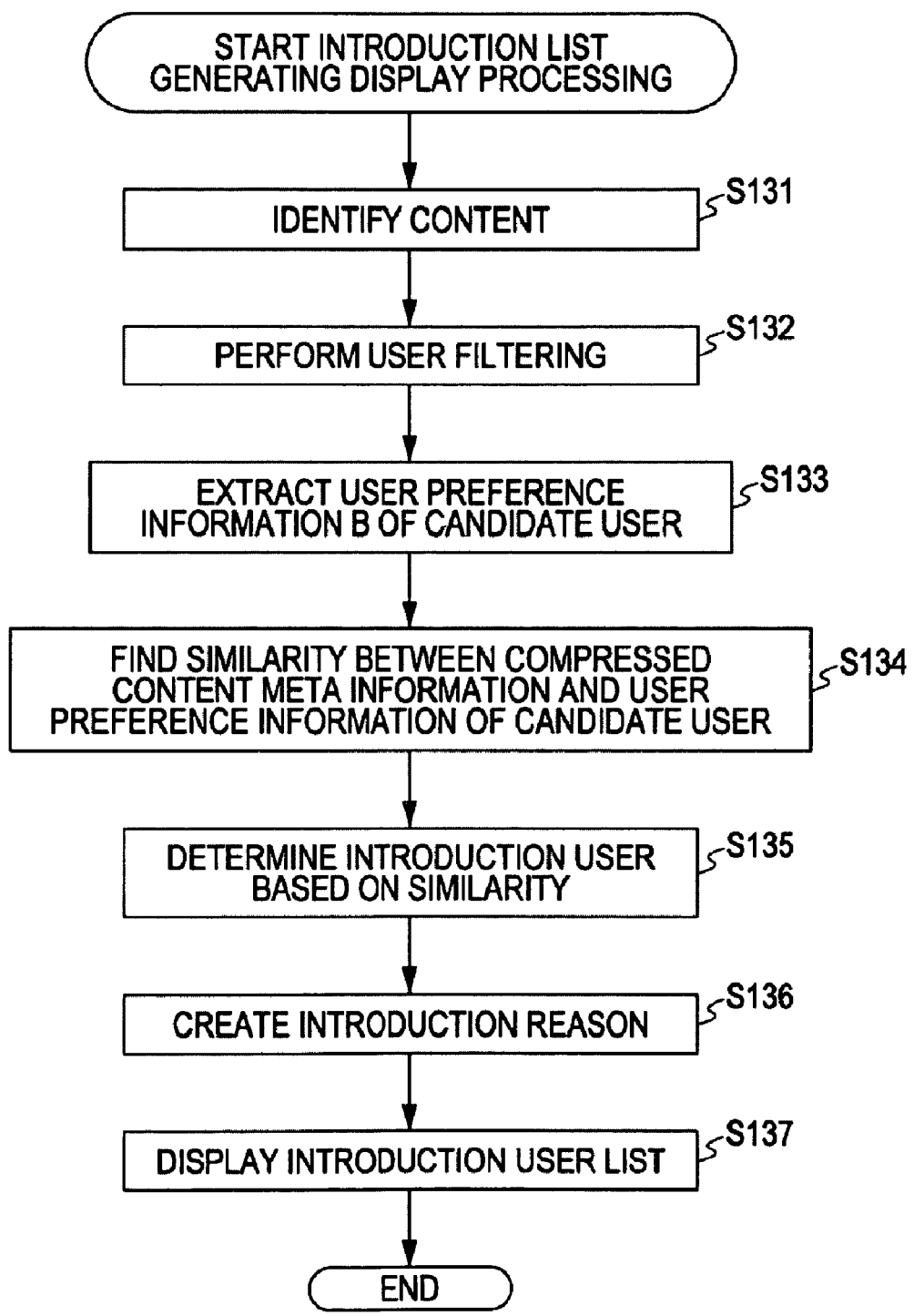
FIG. 24 is a flowchart describing another example of introduction list generating display processing.

With the user introducing system 200 in FIG. 20, the introducing list generating display processing in the case of introducing a user based on the content meta information of predetermined content becomes processing such as that shown in FIG. 24. An example of the introducing list generating display processing in the case of introducing a user based on predetermined content meta information with the user introducing system 200 will be described with reference to the flowchart in FIG. 24. This processing is executed when display of an introducing list based on the content meta information is commanded from a using user, for example.

In step S131, the determining processing unit 237 identifies predetermined content by receiving input of a content ID, for example.

In step S132, the determining processing unit 237 performs filtering of the users based on the content meta information identified in step S131. At this time, for example, an element having a greater value from within the content meta information is searched, and only users having a value of the user preference information A for such element at or above a threshold value are extracted and become candidate users. Note that an arrangement may be made wherein the processing in step S132 is omitted.

In step S133, the determining processing unit 237 extracts the user preference information B of the candidate users obtained with the filtering in step S132 from the B preference information database 236.

In step S134, the determining processing unit 237 computes the similarities between the compressed content meta information of the predetermined content identified in step S131 and the user preference information B for each of the candidate users. At this time, the similarity is computed, for example, as a sign inverted value of the Euclidian distance between a vector of the compressed content meta information and user preference information B.

In step S135, the determining processing unit 237 determines an introducing user based on the similarity obtained by the processing in step S134. At this time, determination is made such that the candidate user corresponding to the user preference information B having a similarity at or greater than a preset threshold value, for example, becomes the introducing user.

In step S136, the presenting processing unit 238 creates an introduction reason based on the user preference information A of the introducing user, for example.

In step S137, the presenting processing unit 238 displays the introducing user list on the browser of the using user, for example. At this time, for example, a screen such as that described above with reference to FIG. 7 is displayed on a screen of the personal computer of the using user or the like. Thus, user introduction based on content meta information is performed.

Up to this point, an example of introducing a user based on the user preference information and an example of introducing a user based on content meta information have been described, but it goes without saying that content can by introduced based on user preference information with the user introducing system 200.

Figure 25:
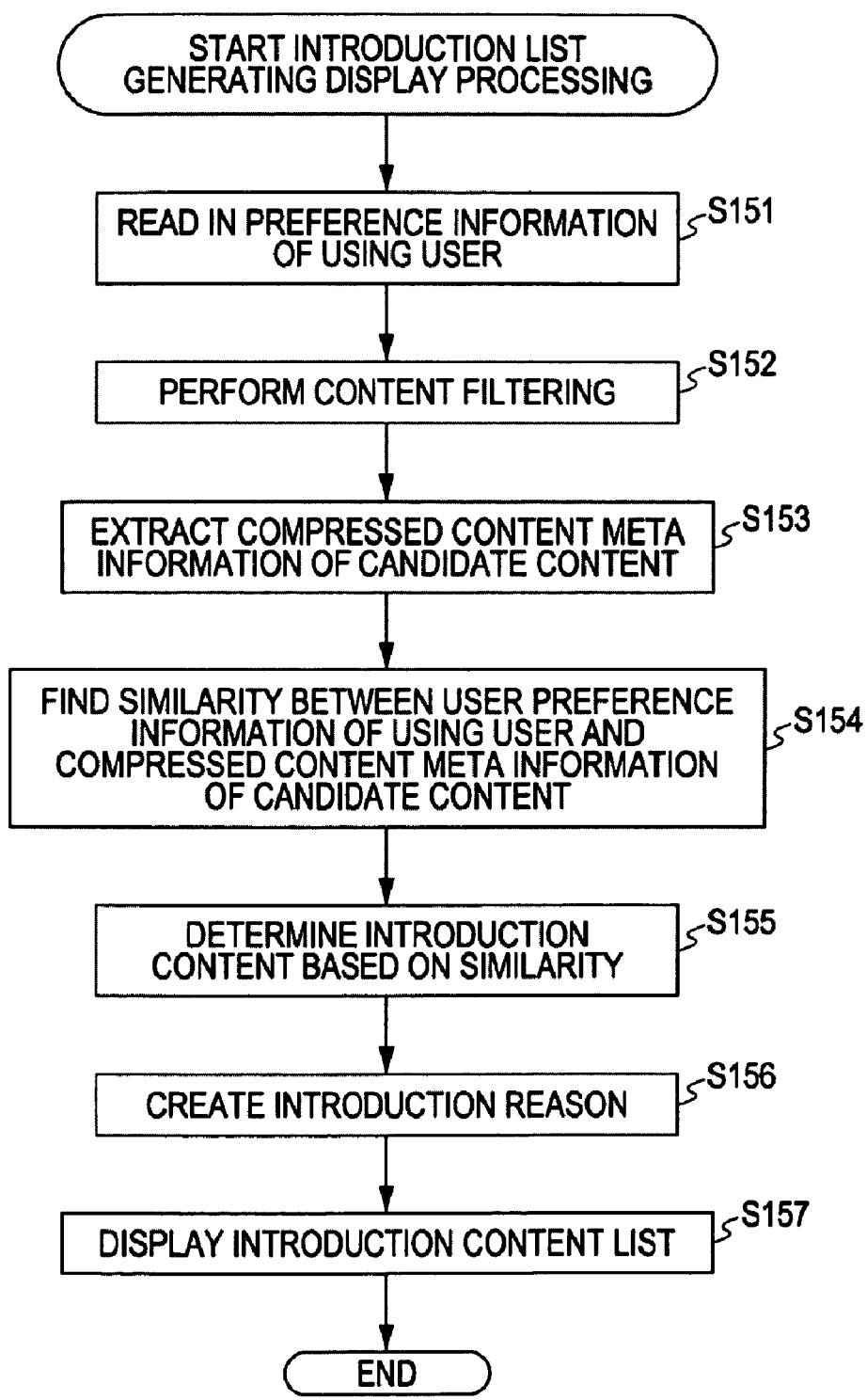
FIG. 25 is a flowchart describing yet another example of introduction list generating display processing.

Next, an example of introducing list generating display processing in the case of introducing content based on the user preference information with the user introducing system 200 will be described with reference to the flowchart in FIG. 25. This processing is executed when display of an introducing list of content based on user preference information is commanded by a using user, for example.

In step S151, the determining processing unit 237 reads in the user preference information A of the using user.

In step S152, the determining processing unit 237 performs filtering of the content meta information based on the user preference information A of the using user read in in step S151. At this time, an element having a greater value is searched from the user preference information A of the using user, for example, and only the content having a content meta information value of such element at or above a threshold value is extracted, and becomes candidate content. Note that the processing in step S152 may be omitted.

In step S153, the determining processing unit 237 extracts the compressed content meta information of the candidate content obtained from the filtering in step S152 from the compressed content meta information database 239.

In step S154, the determining processing unit 237 computes the similarity between the user preference information B of the using user and the compressed content meta information for each of the candidate contents. At this time, the similarity is computed, for example, as a sign inverted value of the Euclidian distance in the case that the user preference information B and the compressed content meta information serve as a vector.

In step S155, the determining processing unit 237 determines the introducing content based on the similarity obtained with the processing in step S154. At this time, for example, candidate content corresponding to the compressed content meta information having a similarity at or above a preset threshold is determined so as to become the introducing content.

In step S156, the presenting processing unit 238 creates an introduction reason based on the content meta information of the introducing content, for example.

In step S157, the presenting processing unit 238 displays the introducing content list on the browser of the using user, for example. At this time, a screen such as that shown in FIG. 26 is displayed on the screen of the personal computer of the using user or the like.

FIG. 26 shows an example of an introducing content list. In this example, the introducing content is displayed as "content 4", "content 5", "content 6", and so on. The introduction reasons for the introducing content "content 4" are "element A2" and "element A5", the introduction reasons for the introducing content "content 5" are "element A1", "element A2", and "element A8", and the introduction reasons for the introducing content "content 6" are "element A5", "element A8", and "element A3". As described above, the "element A1", "element A2", and so on are displayed based on the respective content meta information elements.

Also, the star symbols shown in FIG. 26 show the similarity between the compressed content meta information wherein the introducing content is "content 4", "content 5", "content 6", and so on and the user preference information B of the using user. In this example, "content 4" and "content 5" are displayed with four star symbols, and "content 6" is displayed with three star symbols. Thus, we can easily confirm that the similarity with the "content 4" and "content 5" is higher compared to the similarity with the "content 6".

Note that in order to simplify the description, the introduction reasons in FIG. 26 are written as "element A1", "element A10", "element A2", and so on but in reality these are names of each elements, and introduction reasons such as artist name and genre will be displayed.

Also, an arrangement may be made wherein the elements of the compressed content meta information are displayed as introduction reasons.

The content is thus introduced based on user preference information. Note that description is given here as a content introduction, but in reality, an arrangement may be made wherein a list of contents to be recommended to users can be made, and an introduction content list such as that shown in FIG. 26 can be displayed. Also, an arrangement may be made wherein, for example, the processing described above with reference to FIG. 25 is executed automatically when the user logs in to the user introducing system 200, and a list such as that shown in FIG. 26 is presented as a list of contents to be recommended to the user.

An example of introducing a user based on user preference information, an example of introducing a user based on content meta information, and an example of introducing (recommending) content based on user preference information is described up to this point, but introducing (recommending) content based on content meta information can also be performed with the user introducing system 200. That is to say, according to the present invention, in the case that a user inputs an ID of content that the user desires to view/listen to or content that the user desires to purchase, new content can be introduced (recommended) based on the content meta information.

Figure 27:
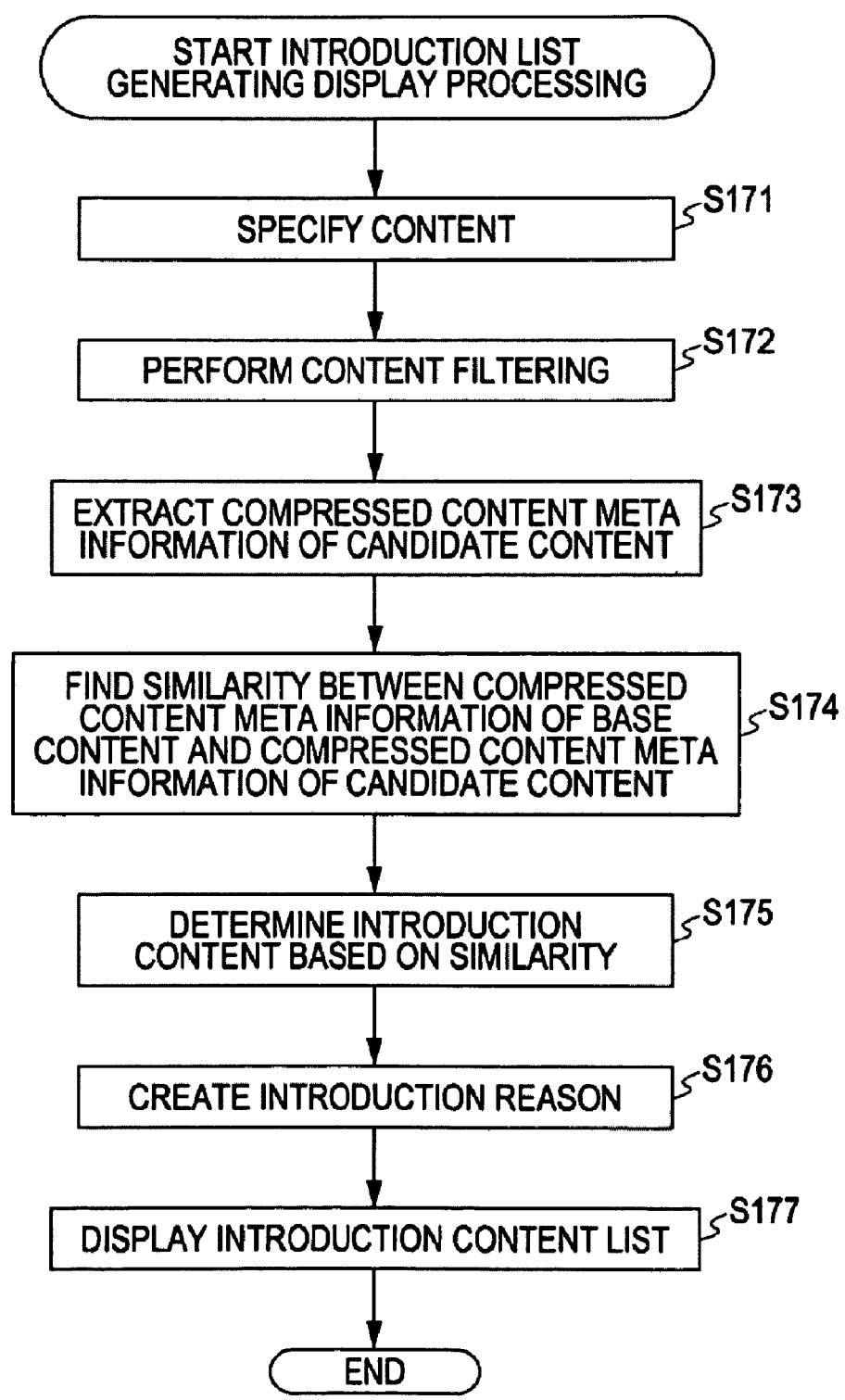
FIG. 27 is a flowchart describing yet another example of introduction list generating display processing.

Next, an example of introducing list generating display processing in the case of introducing content based on the content meta information with the user introducing system 200 will be described with reference to the flowchart in FIG. 27. This processing is executed when display of the content introduction list based on the content meta information is commanded by the using user.

In step S171, the determining processing unit 237 identifies predetermined content by receiving input of a content ID, for example. The content identified here will be called "base point content".

In step S172, the determining processing unit 237 performs filtering of content meta information based on the content meta information of the base point content. At this time, an element having a greater value is searched from the content meta information of the base point content, for example, and only the content having a content meta information value of such element at or above a threshold value is extracted, and becomes candidate content. Note that the processing in step S172 may be omitted.

In step S173, the determining processing unit 237 extracts the compressed content meta information of the candidate content obtained from the filtering in step S172 from the compressed content meta information database 239.

In step S174, the determining processing unit 237 computes the similarity between the compressed content meta information of the base point content and the compressed content meta information for each of the candidate contents. At this time, for example, the similarity is computed as a sign inverted value of the Euclidian distance in the case that the compressed content meta information is a vector.

In step S175, the determining processing unit 237 determines the introducing content based on the similarity obtained from the processing in step S174. At this time, for example, the candidate content corresponding to the compressed content meta information having a similarity at or above a preset threshold value is determined to be the introducing content.

In step S176, the presenting processing unit 238 creates an introduction reason based on the content meta information of the introducing content, for example.

In the step S177, the presenting processing unit 238 displays an introducing content list on the browser of the using user, for example. At this time, for example, a screen such as that shown in FIG. 26 is displayed on a screen of the personal computer of the using user or the like.

Thus, content is introduced based on the content meta information of the base point content. Note that description is given here is content introduction, but in reality, an arrangement may be made wherein an introducing content list such as shown in FIG. 26 is displayed as a list of contents to be recommended to the user. Also, an arrangement may be made wherein, for example, the processing described above with reference to FIG. 27 is executed automatically, when the user inputs a command to view/listen to or purchase the content with the user introducing system 200, with such content as the base point content, and a list such as that shown in FIG. 26 is presented as a list of contents to be recommended to the user.

Note that with the user introducing system 200, in the case of introducing content based on content meta information, an arrangement may be made wherein the user information processing unit 232, A preference information database 234, an B preference information database 236 are not provided thereto.

Note that the above-described series of processing can be executed with hardware, or can be executed with software. In the case of executing the above-described series of processing with software, a program making up such software is installed from a network or recording medium onto a computer built into dedicated hardware, or onto a general-use computer 700 such as shown in FIG. 28 which can execute various types of functions by installing various types of programs.

Figure 28:
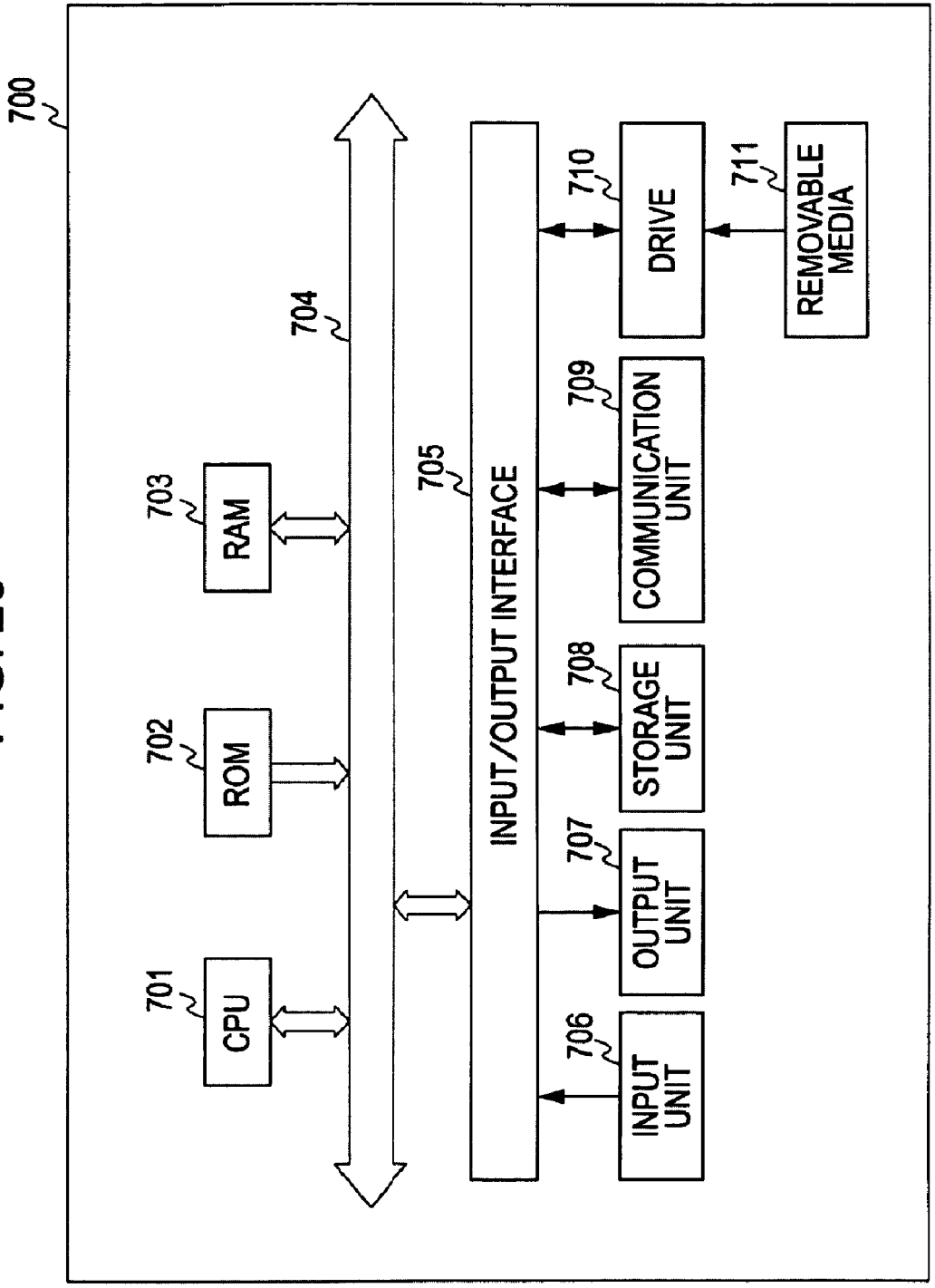
FIG. 28 is a block diagram of a configuration example of a general-use computer.

In FIG. 28, a CPU (Central Processing Unit) 701 executes various types of processing according to a program stored in a ROM (Read Only Memory) 702 or a program loaded on a RAM (Random Access Memory) 703 from a storage unit 708. Data necessary for the CPU 701 to execute various types of programs and so forth are also stored as appropriate on the RAM 703.

The CPU 701, ROM 702, and RAM 703 are mutually connected via a bus 704. This bus 704 is also connected to an input/output interface 705.

The input/output interface 705 is connected to an input unit 706 made up of a keyboard, mouse, or the like, an output unit 707, made up of a display such as a CRT (Cathode Ray Tube), LCD (Liquid Crystal Display) and a speaker or the like, a storage unit 708 made up of a hard disk and the like, and a communication unit 709 made up of a modem or network interface card such as a LAN card and the like. The communication unit 709 performs communication processing via a network including the Internet.

The input/output interface 705 is also connected to a driver 710 as appropriate, a removable media 711 such as a magnetic disk, optical disk, optical-magnetic disk, or semiconductor memory and the like are mounted as appropriate, and a computer program read out therefrom is installed in the storage unit 708 as appropriate.

In the case of executing the above-described series of processing with software, the program making up the software is installed from a network such as the Internet, or a recording medium such as a removable media 711.

Note that the recording medium herein includes not only configurations of a removable media 711 such as magnetic disks (including floppy disks), optical discs (CD-ROM (Compact Disk-Read Only Memory), and DVDs (Digital Versatile Disc)), magneto-optical disks (including MD (Mini-Disk)(registered trademark)), and semiconductor memory, wherein a program is recorded separate from the device main unit to distribute the program to the users, but also includes configurations of a hard disk included in the ROM 702 or storage unit 708 wherein the program is stored and is distributed to the user in the state of being built into the device main unit beforehand.

Note that with the steps for executing the series of processing described above in the present identification, it goes without saying that processing can be performed in a time-series manner in the order described, but processing is not restricted to being performed in a time-series manner, and processing performed in a parallel manner or individually is also included.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
a memory storing a program; and
a processor for executing the program to cause the information processing device to perform a method, the method comprising:
obtaining information relating to data of content that a single user, requesting introduction of a user with similar preferences to oneself, has used;
obtaining content meta information corresponding to content that said single user has used;
generating a first user preference vector with each of said obtained content meta information as elements thereof;
generating a second user preference vector wherein said generated first user preference vector is analyzed and the number of elements of said first user preference vector is compressed;
identifying as a single introducing user a single user that should be introduced to said single using user and corresponding to a second user preference vector having a high similarity to the second user preference vector of the single using user; and
causing overlapping display to said single using user of:
a first polygon expressing only said single using user's preferences; and
a second polygon expressing only said single introducing user's preferences.

2. The information processing device according to claim 1, wherein the number of elements of said first user preference vector are compressed by performing analysis with a multi-topic model regarding said first user preference vector.

3. The information processing device according to claim 2 wherein, said method comprises:
performing analysis of a PLSA multi-topic model, and
reading in a plurality of said first user preference vectors beforehand and learning a parameter of a probability model of said PLSA.

4. The information processing device according to claim 1, wherein said method comprises extracting a user corresponding to that which is predetermined from the first user preference vector stored beforehand, as a candidate user, based on the first user preference vector of said single using user;
and wherein a single user corresponding to that which is predetermined from the second user preference vector of said candidate user is identified as said single introducing user that should be introduced to said using user.

5. The information processing device according to claim 4, wherein said similarity is computed based on Euclidian distance between said second user preference vector of said single using user and said second user preference vector of each of said candidate users,
and wherein said method comprises identifying a single user corresponding to said second user preference vector which has said similarity of a threshold amount set beforehand or greater, as said single introducing user.

6. The information processing device according to claim 1, wherein said method comprises:
generating data for a screen to present a list of said single introducing users to said single using user; and
generating an introduction reason for introducing said single introducing user to said single using user, based on the elements of said first user preference vectors of said single introducing user.

7. The information processing device according to claim 6, wherein said introduction reason is generated based on a predetermined number of element names extracted from the elements of said first user preference vectors of said single introducing user, in the order of large values.

8. The information processing device according to claim 7, wherein said method comprises extracting a predetermined number of elements of the elements of said first user preference vectors of said single using user in the order of large values;
and wherein, in the case that each of the elements of said first user preference vector elements of said single introducing user extracted in order to generate said introduction reason are the same elements as said elements extracted from said first user preference vector of said single using user, said introduction reason generated based on the name of the same elements therein is displayed in a state differing from a display of said introduction reason generated based on another element name.

9. An information processing method comprising the steps of:
obtaining information relating to data of content that a single user, requesting introduction of a user with similar preferences to oneself, has used;
obtaining content meta information corresponding to content that said single user has used;
generating a first user preference vector with each of said obtained content meta information as elements thereof;
generating a second user preference vector wherein said generated first user preference vector is analyzed and the number of elements of said first user preference vector is compressed;
identifying as a single introducing user a single user that should be introduced to said single using user and corresponding to a second user preference vector having a high similarity to the second user preference vector of the single using user; and
causing overlapping display to said single using user of:
a first polygon expressing only said single using user's preferences; and
a second polygon expressing only said single introducing user's preferences.

10. A non-transitory, computer-readable storage medium storing a program that, when executed by a processor, causes a computer to perform a method, the method comprising:
obtaining information relating to data of content that a single user, requesting introduction of a user with similar preferences to oneself, has used;
obtaining content meta information corresponding to content that said single user has used;
generating a first user preference vector with each of said obtained content meta information as elements thereof;
generating a second user preference vector wherein said generated first user preference vector is analyzed and the number of elements of said first user preference vector is compressed;
identifying as a single introducing user a single user that should be introduced to said single using user and corresponding to a second user preference vector having a high similarity to the second user preference vector of the single using user; and
causing overlapping display to said single using user of:
a first polygon expressing only said single using user's preferences; and
a second polygon expressing only said single introducing user's preferences.

11. An information processing device comprising:
a memory storing a program; and
a processor for executing the program to cause the information processing device to perform a method, the method comprising:
obtaining information relating to data of content that a single user, requesting introduction of a user with similar preferences to oneself, has used;
obtaining content meta information corresponding to content that said single user has used;
generating a first user preference vector with the same number of elements as said obtained content meta information;
generating a second user preference vector wherein said generated first user preference vector is analyzed and the number of elements of said first user preference vector is compressed;
generating a compressed meta information vector wherein said content meta information is analyzed as a vector and the number of elements of said content meta information vector is compressed;
identifying as a single introducing user a single user that should be introduced to said single using user and corresponding to a second user preference vector having a high similarity to the second user preference vector of the single using user; and
causing overlapping display to said single using user of:
a first polygon expressing only said single using user's preferences; and
a second polygon expressing only said single introducing user's preferences.

12. The information processing device according to claim 11, wherein the method comprises:
identifying content corresponding to a compressed meta information vector having a high similarity to a second user preference vector determined beforehand from a plurality of said compressed meta information vectors.

13. The information processing device according to claim 11, wherein the method comprises:
identifying content corresponding to a compressed meta information vector having a high similarity to a compressed meta information vector determined beforehand from a plurality of said compressed meta information vectors.

14. An information processing method comprising the steps of:
obtaining information relating to data of content that a single user, requesting introduction of a user with similar preferences to oneself, has used;
obtaining content meta information corresponding to content that said single user has used;
generating a first user preference vector with the same number of elements as said obtained content meta information;
generating a second user preference vector wherein said generated first user preference vector is analyzed and the number of elements of said first user preference vector is compressed;
generating a compressed meta information vector wherein said content meta information is analyzed as a vector and the number of elements of said content meta information vector is compressed;
identifying as a single introducing user a single user that should be introduced to said single using user and corresponding to a second user preference vector having a high similarity to the second user preference vector of the single using user; and
causing overlapping display to said single using user of:
a first polygon expressing only said single using user's preferences; and
a second polygon expressing only said single introducing user's preferences.

15. A non-transitory, computer-readable storage medium storing a program that, when executed by a processor, causes an information processing device to perform a method, the method comprising:
obtaining information relating to data of content that a single user, requesting introduction of a user with similar preferences to oneself, has used;

obtaining content meta information corresponding to content that said single user has used;

generating a first user preference vector with the same number of elements as said obtained content meta information;

generating a second user preference vector wherein said generated first user preference vector is analyzed and the number of elements of said first user preference vector is compressed;

generating a compressed meta information vector wherein said content meta information is analyzed as a vector and the number of elements of said content meta information vector is compressed;

identifying as a single introducing user a single user that should be introduced to said single using user and corresponding to a second user preference vector having a high similarity to the second user preference vector of the single using user; and causing overlapping display to said single using user of:
- a first polygon expressing only said single using user's preferences; and
- a second polygon expressing only said single introducing user's preferences.

* * * * *